(12) United States Patent
Nishikawa et al.

(10) Patent No.: US 11,669,628 B2
(45) Date of Patent: Jun. 6, 2023

(54) DATA MANAGEMENT DEVICE, DATA MANAGEMENT SYSTEM, AND DATA MANAGEMENT METHOD

(71) Applicant: HITACHI, LTD., Tokyo (JP)

(72) Inventors: Norifumi Nishikawa, Tokyo (JP); Mika Takata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/465,114

(22) Filed: Sep. 2, 2021

(65) Prior Publication Data

US 2022/0292212 A1 Sep. 15, 2022

(30) Foreign Application Priority Data

Mar. 9, 2021 (JP) .............................. JP2021-037551

(51) Int. Cl.
*G06F 21/62* (2013.01)
*G06F 17/18* (2006.01)
*G06F 21/64* (2013.01)

(52) U.S. Cl.
CPC .......... *G06F 21/6218* (2013.01); *G06F 17/18* (2013.01); *G06F 21/64* (2013.01); *G06F 2221/2141* (2013.01)

(58) Field of Classification Search
CPC .................. G06F 21/10; G06F 21/6218; G06F 2221/2135; G06F 21/105; G06F 17/18;
(Continued)

(56) References Cited

U.S. PATENT DOCUMENTS

2007/0198422 A1* 8/2007 Prahlad .............. G06Q 20/1235
705/52
2007/0255660 A1* 11/2007 Tanaka ................... G11B 23/40
(Continued)

FOREIGN PATENT DOCUMENTS

JP 2011-238165 A 11/2011

OTHER PUBLICATIONS

Usama et al., "Software Copy Protection and Licensing based on XrMLand PKCS#11," Proceedings of 2011 IEEE Pacific Rim Conference on Communications, Computers and Signal Processing Year: 2011 | Conference Paper | Publisher: IEEE.*
(Continued)

*Primary Examiner* — Roderick Tolentino
(74) *Attorney, Agent, or Firm* — Volpe Koenig

(57) ABSTRACT

The data management device includes a determination unit that determines whether the secondary data generated from the source data to be processed complies with the data handling rules that use statistical information and a data processing unit that performs the processing a determination result by the determination unit. The determination unit estimates the statistical information from the source data to be processed, and determines whether the data handling rule is complied with, prior to the generation of the secondary data, based on whether the secondary data generated based on the estimated statistical information satisfies the statistical values of the statistical information. The data processing unit executes processing when it is determined that the data handling rules are complied with to generate secondary data and does not perform the processing process when it is determined that the data handling rules are not complied with.

7 Claims, 21 Drawing Sheets

(58) Field of Classification Search
CPC . G06F 21/64; G06F 2221/2141; H04L 63/10; H04L 2209/603
See application file for complete search history.

(56) References Cited

U.S. PATENT DOCUMENTS

| | | | |
|---|---|---|---|
| 2007/0265977 A1* | 11/2007 | Read | G06Q 20/1235 705/59 |
| 2008/0127348 A1* | 5/2008 | Largman | G06F 9/45558 726/24 |
| 2009/0328056 A1* | 12/2009 | McCune | G06F 21/105 718/105 |
| 2010/0293103 A1* | 11/2010 | Nikitin | G06F 21/10 726/26 |
| 2011/0138486 A1* | 6/2011 | White | G06F 21/10 705/16 |
| 2013/0091543 A1* | 4/2013 | Wade | G06F 21/53 726/1 |
| 2019/0156445 A1* | 5/2019 | Markham | G06Q 20/12 |
| 2021/0119796 A1* | 4/2021 | Jose | H04L 9/3213 |

OTHER PUBLICATIONS

Mumtaz et al., "Development of a Methodology for Piracy Protection of Software Installations," 2005 Pakistan Section Multitopic Conference Year: 2005 | Conference Paper | Publisher: IEEE.*

* cited by examiner

FIG. 7

| PROCESS | RULE | TRANSFER METHOD |
|---|---|---|
| EXTRACTION | All | TRANSFER RULE OF SOURCE |
| COMBINATION | All | TRANSFER RULE OF SOURCE |
| AGGREGATION | R1-3,5 | TRANSFER RULE OF SOURCE |
|  | R4 | NOT TRANSFER WHEN PREDETERMINED k VALUE IS SATISFIED |
| AI MODEL CONSTRUCTION | R1-3,5 | TRANSFER RULE OF SOURCE |
|  | R4 | NOT TRANSFER WHEN k VALUE OF EXPLANATORY FACTOR IS SATISFIED |

| SOURCE | PROCESS | GENERATED DATA | HANDLING RULE |
|---|---|---|---|
| NDB | EXTRACTION | D1 | R1, R2, R3 |
| KDB | EXTRACTION | D2 | R4, R5 |
| D1, D2 | COMBINATION | D3 | R1, R2, R3, R4, R5 |
| D3 | AGGREGATION | D4 | R1, R2, R3, R5 |

33

DATA MANAGEMENT DEVICE, DATA MANAGEMENT SYSTEM, AND DATA MANAGEMENT METHOD

BACKGROUND OF THE INVENTION

1. Field of the Invention

The present invention relates to a data management device, a data management system, and a data management method. Without limitation, for example, the present invention relates to a server or the like that performs delicate data processing (extraction from a database, combination of information, and the like) that requires careful handling.

2. Description of Related Art

In recent years, there has been an increasing demand for strengthening the legal protection of non-public information (sensitive data) of individuals or corporations in relation to social problems such as leakage of various data due to hacking.

On the other hand, for example, between related companies and medical networks, the distribution of sensitive data among a plurality of companies is progressing in order to realize data free flow with trust (DFFT), that is, reliable and free data distribution.

In a system in which a huge amount of information is output during operation, such as robot sensor data in a factory production process, and such information (so-called big data) is treated as an analysis target for improving productivity, an increase in data processing time due to the large-scale data is also a problem.

Alternatively, even in a system that handles a large amount of information about members (individuals) and their families in a database, such as a large company or a government office, an increase in the data processing time due to the large-scale data becomes a technical issue.

As response to such a problem, the technique described in JP-A-2011-238165 seeks to improve the efficiency of management of confidential documents scattered in an organization by managing the metadata such as specifying a file for which the metadata of an electronic file should be updated.

On the other hand, the technique described in JP-A-2011-238165 is limited to a configuration in which the value of the metadata is propagated to the derived data by using lineage, and therefore, it is considered that there are the following problems.

That is, in the technique described in JP-A-2011-238165, when processing sensitive data, even if the sensitive data and the rules applied to the processing (for example, k value) are not satisfied, processing will be performed. Therefore, there are cases where the technique described in JP-A-2011-238165 does not contribute to the reduction of data preparation man-hours.

SUMMARY OF THE INVENTION

An object of the present invention is to provide a data management device, a data management system, and a data management method that can contribute to the reduction of data preparation man-hours.

The data management device according to the present invention includes a determination unit for determining whether the secondary data generated from the source data to be processed complies with the data handling rule using statistical information, and a data processing unit that performs processing according to the determination result according to the above, in which the determination unit estimates the statistical information from the source data to be processed, prior to the generation of the secondary data, based on whether the secondary data generated based on the estimated statistical information satisfies the statistical value of the statistical information, and determines whether the data handling rules are complied with, and the data processing unit executes the processing to generate the secondary data when it is determined that the data handling rule is complied with, and does not execute the processing when it is determined that the data handling rule is not complied with.

The data management system according to the present invention includes the above data management device and a user terminal that communicates with the data management device and requests the processing process for the source data, and the data management device sets the access right to the secondary data in the user terminal after generating the secondary data.

Another aspect of the present invention is a data management method that determines whether secondary data generated from the source data to be processed complies with the data handling rule using statistical information, and performs processing in response to the determination result, in which prior to the generation of the secondary data, the statistical information is estimated from the source data to be processed, and it is determined whether the data handling rules are complied with based on whether the secondary data to be generated based on the estimated statistical information satisfies the statistical value of the statistical information, and the processing is executed to generate the secondary data when it is determined that the data handling rule is complied with and the processing process is not executed when it is determined that the data handling rule is not complied with.

In the present invention, whether the secondary data generated from the source data to be processed has complied with the data handling rule is determined prior to the processing, and if it is determined that the data handling rule is not complied with, the secondary data is not generated because the processing is not executed. Therefore, according to the present invention, it is possible to contribute to the reduction of data preparation man-hours.

BRIEF DESCRIPTION OF THE DRAWINGS

FIG. 7 is a diagram showing an example of a processing method and rule transfer method management table owned by the data processing server;

FIG. 8 is a diagram showing an example of a lineage management table owned by the data processing server;

DESCRIPTION OF EMBODIMENTS

The present embodiment will be described in detail with reference to the drawings.

In general, the embodiment described below is a system using a computer (electronic computer), in which (1) the statistical information value of the generated secondary data is estimated, (2) a handling rule applied to the secondary data is determined, (3) whether data satisfies the handling rule is estimated from the statistical information value of the data estimated in (1) above, and (4) when a data operation (query) is received, the handling rule of the generated data is determined, the statistical information value of the data is calculated, whether the data satisfies the handling rule is estimated, and data operations (queries) for generating the secondary data are executed only when the handling rule is satisfied.

With the above configuration, the data operation (query) is not executed for data that is estimated not to satisfy the handling rule, which makes it possible to reduce the data preparation man-hours.

Among the above, a non-limiting representative example of the "statistical information value" is the k value. As is well known, the larger the k value of the information constituting the secondary data, the more difficult it is to identify an individual or the like, and the smaller the k value, the easier it is to identify an individual or the like.

Figure 1:
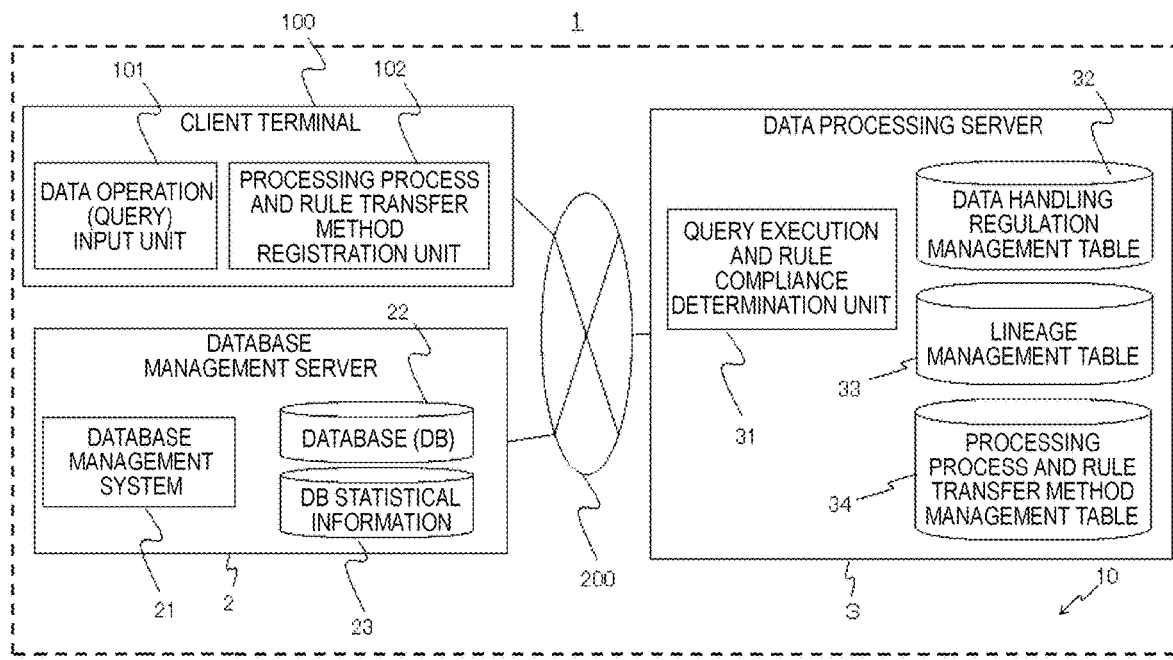
FIG. 1 is a schematic functional block diagram showing a specific example of an information processing system according to the present embodiment.

FIG. 1 is a schematic functional block diagram showing a specific example of an information processing system according to an embodiment to which the present invention is applied. As shown in FIG. 1, the information processing system 1 in the present embodiment includes a database management server 2 that manages a database, a data processing server 3 that processes database data, a client terminal 100 that accesses the database, and a communication line 200 for connecting to each other.

Among above, the information processing system 1 corresponds to the "data management system" of the present invention, the data processing server 3 corresponds to the "data management device" of the present invention, and the client terminal 100 corresponds to the "user terminal" of the present invention.

The database management server 2 of the information processing system 1 includes a database management system 21, a database (DB) in which various data are registered, and DB statistical information 23, which is the result (aggregated information) of the statistic processing of the data registered in the database (DB) 22.

In the following description, as the database (DB) 22, two types of databases, a first DB (hereinafter referred to as "NDB") and a second DB (hereinafter referred to as "KDB"), are stored, and it is assumed that different handling rules are applied to the data processing for NDB and the data processing for KDB.

However, the above assumption is for simplification of explanation, or the like, and in actual operation, more types of databases can be stored as the database (DB) 22, and conversely, it may be configured to store one type of database (in other words, a DB to which one type of rule is applied).

The data processing server 3 of the information processing system 1 (hereinafter, may be appropriately referred to as "the present system") includes a query execution and rule compliance determination unit 31, a data handling regulation management table 32, a lineage management table 33, and a processing method and rule transfer method management table 34. Details of each of the parts will be described later.

The client terminal 100 includes a data operation (query) input unit 101 for inputting a query for operations (for example, browsing, aggregation (list display), printing, and the like) regarding database data managed in the present system, and a processing method and rule transfer method registration unit 102 for which details will be described later.

The client terminal 100 can be technically implemented by, for example, a personal computer or a mobile terminal, but in the present embodiment, a dedicated terminal is assumed to be used in order to strengthen the management of sensitive data.

Next, the outline of how to use the present system and the main configuration will be described. The user operates the data operation (query) input unit 101 of the client terminal 100 to access the database 22 (here, NDB or KDB) of the database management server 2. Here, the user (client terminal 100) is provided in the form of secondary data in which the data (source data) of the database 22 is processed. Here, as a non-restrictive representative example of data processing, data extraction, combination (combination), aggregation, and the like can be mentioned. In the present embodiment, the data processing server 3 executes the processing of the data processing.

In other words, the user (client terminal 100) accesses the database 22 of the database management server 2 via the data processing server 3. In addition, the database 22 (NDB and KDB) of the database management server 2 is preset with the data handling rules described later in FIGS. 6 and 7, and the user (client terminal 100) can access the database within the range according to the set data handling rules.

In the present embodiment, the data processing server 3 in the present system determines whether the query input by the client terminal 100 and the secondary data generated by the processing complies with the above data handling rules and performs processing according to the determination result.

More specifically, the data processing server 3 includes a query execution and rule compliance determination unit 31 (corresponding to the "determination unit" of the present invention) for determining whether the secondary data generated from the source data to be processed (for example, extraction, combination, aggregation) complies with the data handling rule using statistical information, and a data processing unit for performing processing according to the determination result. The functions of each of the parts can be realized by the CPU 301 of the data processing server 3 described later in FIG. 2.

Then, the query execution and rule compliance determination unit 31 (determination unit) of the data processing server 3 estimates the statistical information from the source data to be processed prior to generating the secondary data and determines the estimated statistics. It is determined whether the secondary data generated based on the estimated statistical information complies with the data handling rules based on whether the statistical value (mainly the k value) of the statistical information is satisfying. The data processing unit of the data processing server 3 executes processing when it is determined that the data processing server 3 complies with the data handling rule to generate secondary data, and when it is determined that the data handling rule (hereinafter, may be simply referred to as "rule") is not complied with, the processing is not executed. According to the present embodiment having such a configuration, it is possible to reduce the man-hours for data preparation while strengthening the management of sensitive data.

Next, the flow of signals or information in the information processing system 1 of the present embodiment will be outlined. In the present system, the query input to the data operation (query) input unit 101 of the client terminal 100 is passed to the query execution and rule compliance determination unit 31 of the data processing server 3 via the communication line 200.

The query execution and rule compliance determination unit 31 of the data processing server 3 that has acquired the query executes a predetermined program (described later in FIGS. 9 to 16) to determine whether the query complies with the rules and makes an inquiry to the database management server 2 (database management system 21) to acquire the inquiry result, and the acquired result is returned to the data operation (query) input unit 101 of the client terminal 100. In one specific example, the query execution and rule compliance determination unit 31 returns the processed secondary data if the data generated in response to the query complies with the rule, and a warning that the data does not comply with the rule if the data does not comply with the rule, to the data operation (query) input unit 101. In another specific example, the query execution and rule compliance determination unit 31 sets an access right to the client terminal 100 when the data generated in response to the query complies with the rule, and when the data does not comply with the rule, the above warning is given without setting the access right.

In the present embodiment, the setting of the rule applied to the secondary data generated by the above-mentioned processing is set for each processing (for each type of processing) via the processing and rule transfer method registration unit 102 of the client terminal 100, which is a dedicated terminal. In the present embodiment, the information input to the processing and rule transfer method registration unit 102 of the client terminal 100 is registered in the processing and rule transfer method management table 34 of the data processing server 3.

Although the database management server 2 and the data processing server 3 are illustrated as separate terminals in FIG. 1, the database management server 2 and the data processing server 3 may be one device, that is, the same server. Alternatively, the database management server 2 and the client terminal 100 may be configured as one device, the data processing server 3 and the client terminal 100 may be configured as one device, and a configuration in which the database management server 2, the data processing server 3, and the client terminal 100 may be configured as one device.

Figure 2:
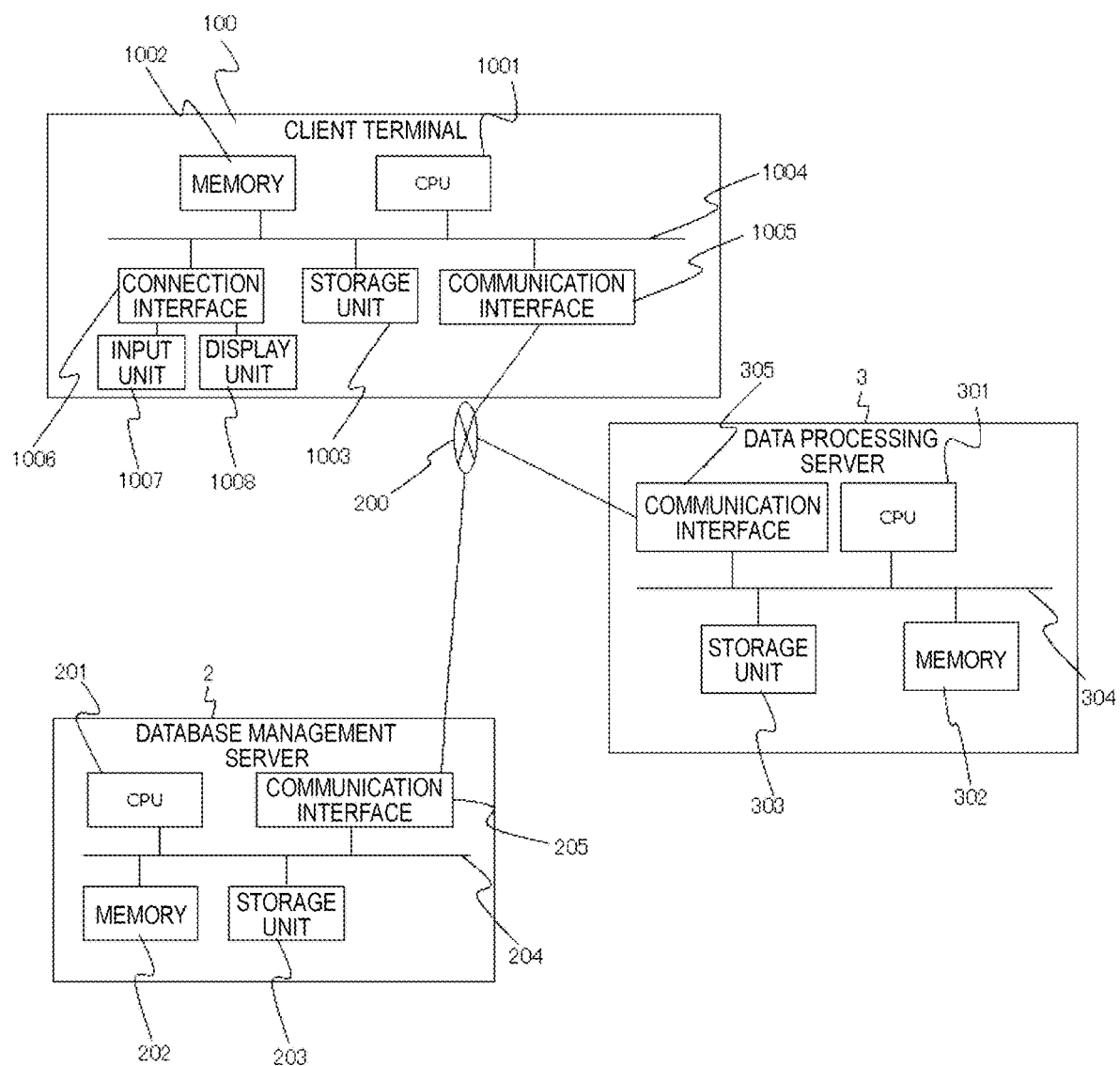
FIG. 2 is a block diagram illustrating an example of hardware configurations of a database management server, a data processing server, and a client terminal, constituting an information processing system.

Next, with reference to FIG. 2, an example of the hardware configuration of the database management server 2, the data processing server 3, and the client terminal 100 described above will be described. FIG. 2 is a block diagram showing a hardware configuration in the information processing system 1 of the present embodiment. Hereinafter, a specific example of the hardware configuration in the present system will be described with reference to FIG. 2.

The database management server 2, the data processing server 3, and the client terminal 100 described above in FIG. 1 can be realized by a general information processing device such as a server device, a personal computer, or a workstation. In the following, for convenience of explanation, the database management server 2, the data processing server 3, and the client terminal 100 may be simply referred to as "devices 2, 3, and 100" and the like.

Generally, as shown in FIG. 2, the hardware configurations of the devices 2, 3, and 100 can have configurations including, in the order of the devices 2, 3, and 100, CPUs 201, 301, and 1001, communication interfaces 205, 305, and 1005, memories 202, 302, and 1002, storage units 203, 303, and 1003, and buses 204, 304, and 1004 connecting the above. Then, the devices 2, 3, and 100 are connected to each other via the network 200.

In FIG. 2, the client terminal 100 is provided with a connection interface 1006, an input unit 1007 such as a keyboard and a mouse, and a display unit 1008 such as an LCD. Each of these units may include the database management server 2 and the data processing server 3.

The hardware components of these devices 2, 3, and 100 will be described below with the data processing server 3 as a typical example. Since the hardware components of the other devices, 2 and 100 are the same as the hardware components of the data processing server 3, the description thereof will be omitted as appropriate.

The CPU 301 of the data processing server 3 is a hardware processor that controls each part of the data processing server 3. The CPU 301 performs various functions as the "data management device" of the present invention, such as "determination unit", "data processing unit", and "data statistical information calculation unit".

As the memory 302 of the data processing server 3, various storage media (hardware memory) such as ROM and HDD can be used. As such, the storage unit 303 of the data processing server 3 can also use various storage media (hardware memory) in the same manner. As the communication interface 305, various devices for communicating with other terminals via the communication line 200, such as a modem and a communication card, may be used. Each of the parts is connected to each other through a bus 304.

Figure 3:
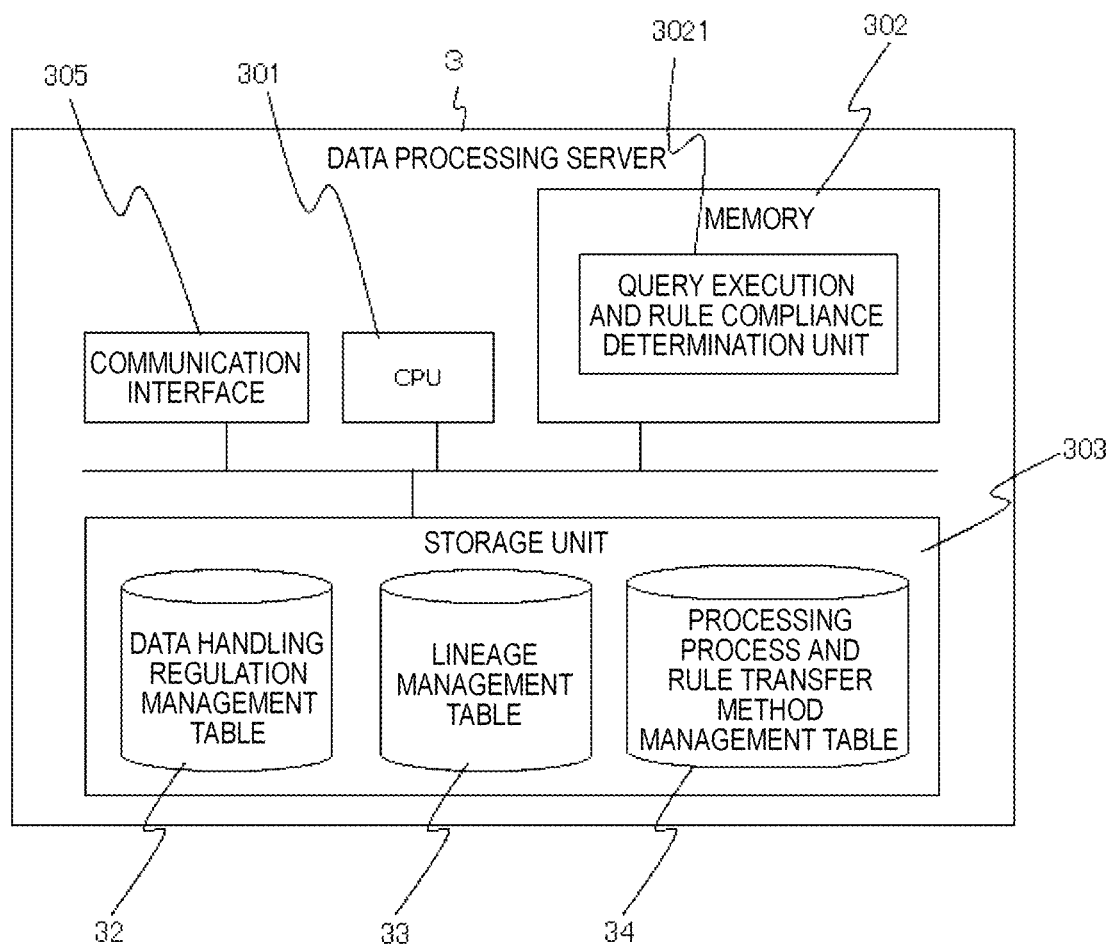
FIG. 3 is a block diagram illustrating further details of a data processing server in the information processing system.

FIG. 3 is a block diagram showing details of the data processing server 3. As shown in FIG. 3, the data processing server 3 stores the query execution and rule compliance determination unit 3021 as a software program in the memory 302. In the storage unit 303 of the data processing server 3, a data handling regulation management table 32, a lineage management table 33, and a processing and rule transfer method management table 34 are stored.

Then, the CPU 301 of the data processing server 3 reads and executes the query execution and rule compliance determination unit 3021 (software program) stored in the memory 302 to serve as the query execution and rule compliance determination unit (3021). Here, the CPU 301 determines whether the user can access the data desired by referring to the above tables (32 to 34) of the storage unit 303. Then, the CPU 301 issues (sets) an access right for accessing the data to the client terminal 100 when the access to the data is permitted according to the determination result, and when the access is not permitted, the CPU 301 does not issue (set) the access right.

Figure 4:
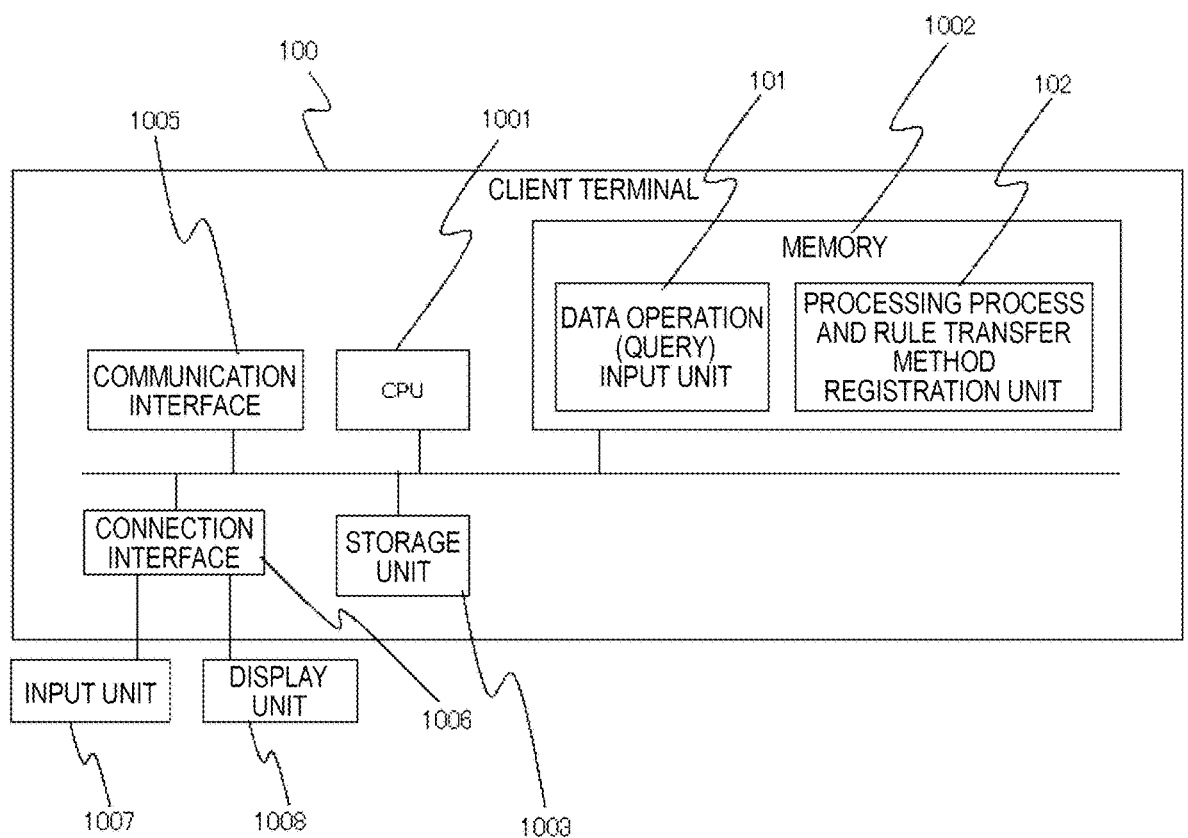
FIG. 4 is a block diagram illustrating further details of a client terminal in the information processing system.

FIG. 4 is a block diagram showing details of the client terminal 100 operated by the user. As shown in FIG. 4, the client terminal 100 stores a data operation (query) input unit 1003 and a processing and rule transfer method registration unit 1004 (each software program) in the memory 1002.

In general, the CPU 1001 of the client terminal 100 expresses these functions by reading and executing the data operation (query) input unit 1003 and the processing and rule transfer method registration unit 1004 in the memory 1002 and displays the input screen or the like regarding the data desired by the user. Then, the CPU 1001 of the client terminal 100 sends the information input to the input screen by the user's operation to the data processing server 3 via the communication interface 1005 and the network 200. After that, as described above, when the data processing server 3 permits access to the data and the access right is issued (set), the CPU 1001 of the client terminal 100 performs the process of displaying the screen for performing an operation to access the data to the user. The screens and processing procedures for such data access have little relevance to the features of the present embodiment and known techniques can be used, and thus the description thereof will be omitted as appropriate. The above input screen (query input screen) will be described later with reference to FIG. 24 and the like.

Figures 5, 6:
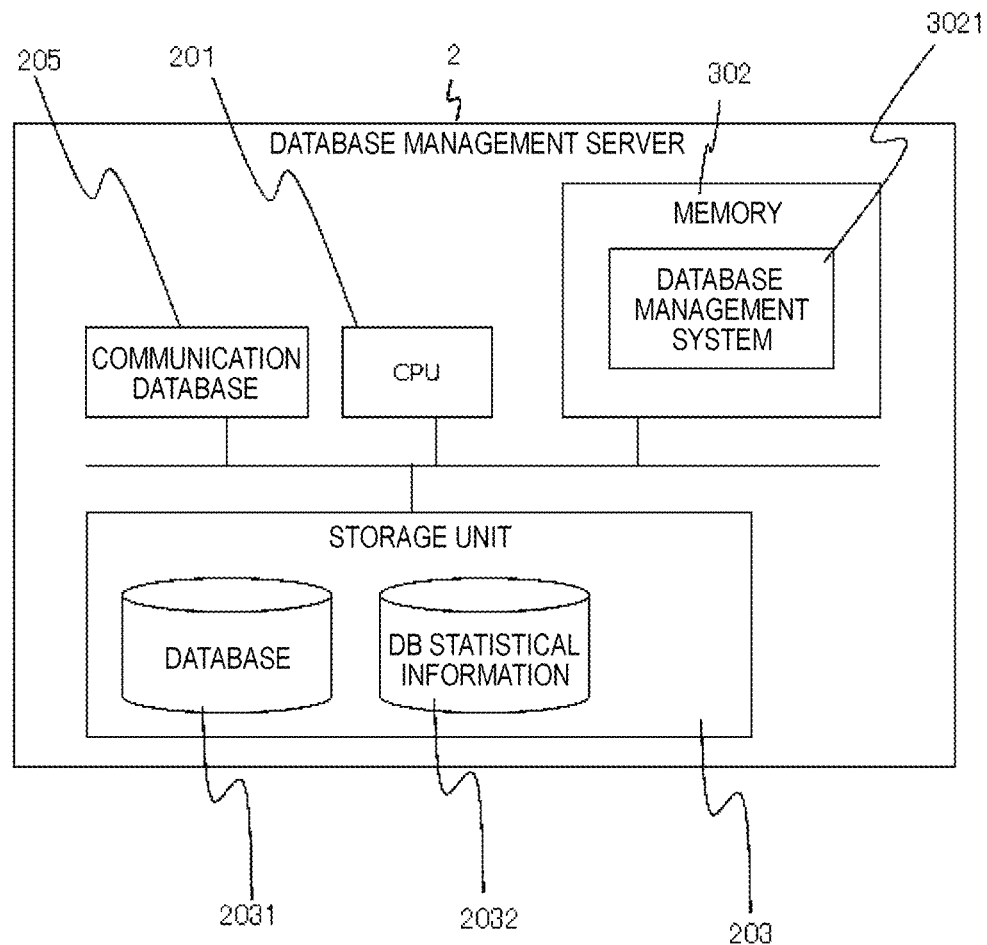
FIG. 5 is a block diagram illustrating further details of a database management server in the information processing system.
FIG. 6 is a diagram showing an example of a data handling regulation management table owned by the data processing server.

FIG. 5 is a block diagram showing details of the database management server 2. As shown in FIG. 5, the database management server 2 includes a database management system 2021 as a software program in the memory 202. The database 22 and the database statistical information 23 are stored in the storage unit 302 of the database management server 2.

The database management server 2 performs various functions as the database management server 2 by the CPU 201 reading and executing the database management system 3021 in the memory 302.

For example, the database management server 2 receives an instruction (command) sent from the data processing server 3 via the network 200 (see FIG. 2) and the communication interface 205 under the control of the CPU 201. Then, the CPU 201 of the database management server 2 searches the storage unit 203 for the data specified in the received command (designated by the command), reads the data and transmits the read data to the data processing server 3.

<Specific Example of the Data Handling Regulation Management Table>

FIG. 6 is a diagram showing an example of the data handling regulation management table 32 stored in the storage unit 303 of the data processing server 3. The data handling rule management table 32 corresponds to the "data handling rule" of the present invention.

The data handling regulation management table 32 shown in FIG. 6 defines handling rules for each data of the two types of databases (NDB and KDB) owned by the database management server 2 described above. In one non-restrictive example, the NDB owned by the database management server 2 is a database in which national medical information is stored (for example, "receipt information and specific medical examination information database"), and the KDB is k-Anonymity, that is, a database that registers data that should be anonymized.

In one specific example shown in FIG. 6, three rules R1, R2, and R3 regarding the handling of data registered in the above NDB are registered in the data handling regulation management table 32. In the data handling regulation management table 32, two rules R4 and R5 regarding the handling of data registered in the above KDB are registered.

Specifically, the above three rules for NDB are as follows.
First rule (R1): The number of copies is limited to 1.
Second rule (R2): Cross-check with other information is prohibited.
Third rule (R3): Access to data that does not satisfy a predetermined k value (for example, k>3) is prohibited.

In one specific example, the data registered in the NDB is set so that one or more of the above rules R1 to R3 is applied. Regarding the rule R3, for example, the setting of the k value can be changed for each type of data. However, in order to avoid complicating the explanation, the k value of rule R3 is as described above unless otherwise specified.

The above two rules regarding KDB are as follows.
Fourth rule (R4): If the application is not a predetermined one (XXX), access to data that does not satisfy k value >10 is prohibited.
Fifth rule (R5): When used by a company, k value >5.

In one specific example, the data registered in KDB is set so that any one or more of the above R4 or R5 rules are applied. Similarly, regarding the k values of rules R4 and R5, for example, the settings can be changed for each type of data, but unless otherwise specified, the k values of rules R4 and R5 are as described above.

The above-mentioned five rules and their setting methods are merely examples, and it is needless to say that more rules or more complicated rules can be created and set in actual operation.

<Specific Example of the Processing Method and Rule Transfer Method Management Table>

FIG. 7 is a diagram showing an example of the processing method and rule transfer method management table 34 stored in the storage unit 303 of the data processing server 3. The processing method and rule transfer method management table 34 corresponds to the "data handling rule" of the present invention.

In the example shown in FIG. 7, in the processing method and rule transfer method management table 34, the types of processing for the data registered in the above-mentioned databases (NDB, KDB), and handling rules and rule transfer methods for the secondary data generated by the processing are stipulated.

In the example shown in FIG. 7, four types of processing are illustrated: extraction, combination, aggregation, and AI model construction, but in actual operation, more types of processing can be, of course, specified. Hereinafter, for the sake of simplicity, the processing process may be simply referred to as processing.

In one specific example shown in FIG. 7, the rule applied to the process "extraction" is "ALL", that is, all the rules (R1 to R5 shown in FIG. 6 in the present example), and the transfer method transfers the rules applied to the source data ("source" in FIG. 7, the same applies below). As such, the same applies to the process "combination".

"Source data" means data that is directly targeted for processing (for example, combination) and is not limited to raw data.

Therefore, even processed data (for example, data obtained by combining two data) can be "source data" for the next processing (for example, aggregation).

On the other hand, the transfer method applied to the processing "aggregation" is different depending on the case where the rule R4 is applied to the source data, and the case where a rule other than R4 (that is, when rules R1 to R3 and R5 are applied) is applied to the source data.

In other words, when rules R1 to R3 or rule R5 are applied to the process "aggregation", the transfer method transfers the rules of the source data. On the other hand, when the rule R4 is applied to the processing "aggregation" and the predetermined k value is satisfied, the rule of the source data is not transferred. In this respect, the same applies to the processing "AI model construction".

Specifically, in the case of AI model construction to which rules R1 to R3 or rule R5 are applied, the rules of the source data are transferred. On the other hand, when the rule R4 is applied to the processing "AI model construction" and the k value of the explanatory factor is satisfied, the source data is not transferred.

FIG. 8 is a diagram showing an example of the lineage management table 33 stored in the storage unit 303 of the data processing server 3. In the lineage table 33 shown in FIG. 8, the history (lineage) of the data processing executed by the data processing server 3 in response to one query requested by the user (client terminal 100) is registered in chronological order from the top. In the present example, it can be seen that the data processing server 3 has performed the following processing in response to the above query.

That is, the data processing server 3 first extracted data from the NDB according to the handling rules R1, R2, and R3 (see FIG. 6 as appropriate), and generated data D1 as secondary data. Subsequently, the data processing server 3 extracted data from the KDB according to the handling rules R4 and R5 (see FIG. 6 as appropriate) to generate data D2 as secondary data.

The data processing server 3 generated data D3 (that is, a combination of data D1 and D2) by combining the generated data D1 and D2 as source data. If the handling rules applied at the time of the combination (at the time of generating the data D3) are R1, R2, R3, R4, and R5 and when any of the rules are not complied with at the time of generating data D3, the data processing server 3 does not generate the data D3. In other words, the data D3, which is the generated secondary data, is generated after being determined to comply with all the handling rules at the time of processing.

Finally, the data processing server 3 aggregates the generated data D3 as source data and generates data D4 as secondary data. If the handling rules applied at the time of such aggregation (at the time of generating the data D4) are R1, R2, R3, and R5 and any of the rules are not complied with at the time of generating the data D4, the data processing server 3 does not generate data D4. In other words, the generated secondary data, the data D4, is generated after being determined to comply with the above rules at the time of aggregation processing. As can be seen with reference to FIGS. 8 and 7, when the data D4 is generated, the rule R4 satisfies a predetermined k value, it can be understood that the rule R4 is not transferred.

By configuring the lineage table 33 as described above, it is possible to check the content of the processing process performed by the data processing server 3, the processing order, and the rules to be followed, as necessary, which make it possible to improve the maintenance and to strengthen data management.

<Flow of Process Performed by the Query Execution and Rule Compliance Determination Unit>

FIGS. 9 to 16 are flowcharts showing various specific examples of the processing contents executed by the query execution and rule compliance determination unit 31 of the data processing server 3. In the following, for convenience of explanation, the flowcharts shown in FIGS. 9 to 16 may be referred to as the first to eighth programs.

First, the outline of the processing shown in FIG. 9 will be described. The query execution and rule compliance determination unit 31 of the data processing server 3 checks whether the secondary data generated by a single data operation (query) complies with the rule. More specifically, the query execution and rule compliance determination unit 31 calculates using the DB statistical information 23 in the database management server 2 whether the rule is compliant before the generation of the secondary data (that is, before processing of source data), and even when it is determined that the rule is compliant (when generating the secondary date), confirms whether the rule is compliant again after the generation of the data (second determination), and when it is determined (calculated) that the rule is not compliant in the second determination, the data generation is not executed.

The following will be explained in more detail. In step S301, the query execution and rule compliance determination unit 31 acquires a data operation (query). The query is typically acquired by the data processing server 3 receiving a query input (instructed) by the user through the data operation (query) input unit 101 of the client terminal 100 described above in FIG. 1. The same applies to the case of query acquisition in other flowcharts such as FIG. 10, and the description thereof will be omitted as appropriate below.

In step S302, the query execution and rule compliance determination unit 31 acquires the source data included in the query.

Figure 24:
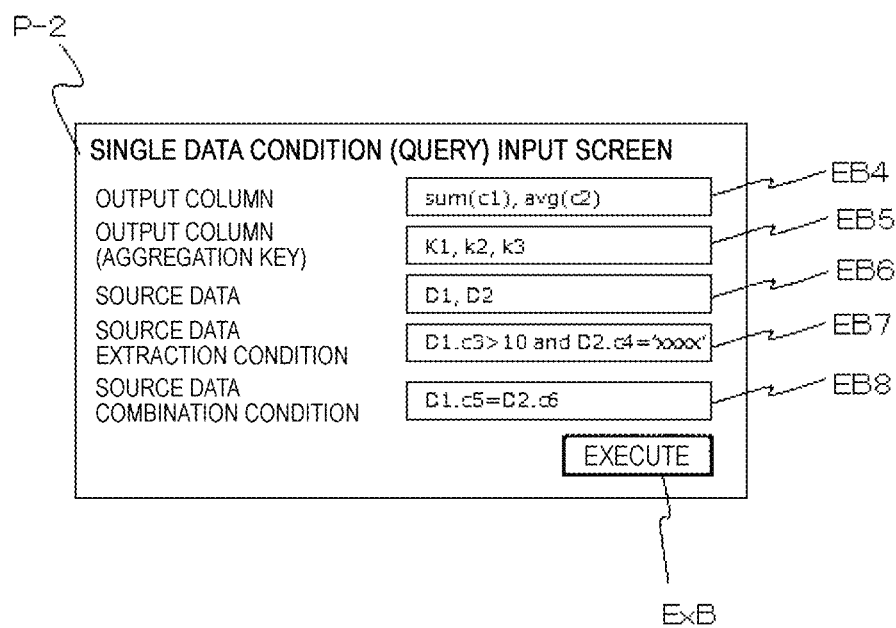
FIG. 24 is a diagram illustrating a specific example of a display screen for inputting a single data operation (query)

In step S303, the query execution and rule compliance determination unit 31 acquires an aggregation key string included in the query (see FIG. 24 and the like as appropriate).

In step S304, the query execution and rule compliance determination unit 31 acquires the rule of the source data acquired in the previous step. Here, the query execution and rule compliance determination unit 31 can acquire the rule of the source data by referring to the lineage management table 33 described above in FIG. 8.

In step S305, the query execution and rule compliance determination unit 31 calculates (calculates) the statistical information value (k value) of the generated data. Here, the query execution and rule compliance determination unit 31 calculates (calculates) the statistical information value (k value) of the generated data by using the statistical information 23 of the database of the database management server 2 described above in FIG. 1.

In step S306, the query execution and rule compliance determination unit 31 determines the rule applied to the generated data. Here, the query execution and rule compliance determination unit 31 refers to the processing method and rule transfer method management table 34 described above in FIG. 7 to acquire the rules applied to the generated data (secondary data).

In step S307, the query execution and rule compliance determination unit 31 executes preprocessing (calculation) for determining whether the data to be generated complies with the rule.

In step S308, the query execution and rule compliance determination unit 31 determines whether the data to be generated complies with the rule.

Here, when the query execution and rule compliance determination unit 31 determines that the data to be generated complies with the rule (steps S308, YES), the process proceeds to step S309. On the other hand, when the query execution and rule compliance determination unit 31 determines that the data to be generated does not comply with the rule (step S308, NO), the query execution and rule compliance determination unit 31 determines that access to the user should not be permitted, and the routine ends.

In step S309, the query execution and rule compliance determination unit 31 executes a data generation operation (query).

In step S310, the query execution and rule compliance determination unit 31 re-checks whether the rule is complied with for the generated data, and then sets the access right to the user for the generated data.

In one specific example, the query execution and rule compliance determination unit 31 issues a password having a predetermined digit as an access right, and transmits the password to the client terminal 100 described above in FIG. 1.

After that, the user can access the data by the process (for example, "viewing") input through the data operation (query) input unit 101 of the client terminal 100.

<Second Program>

Figure 9:
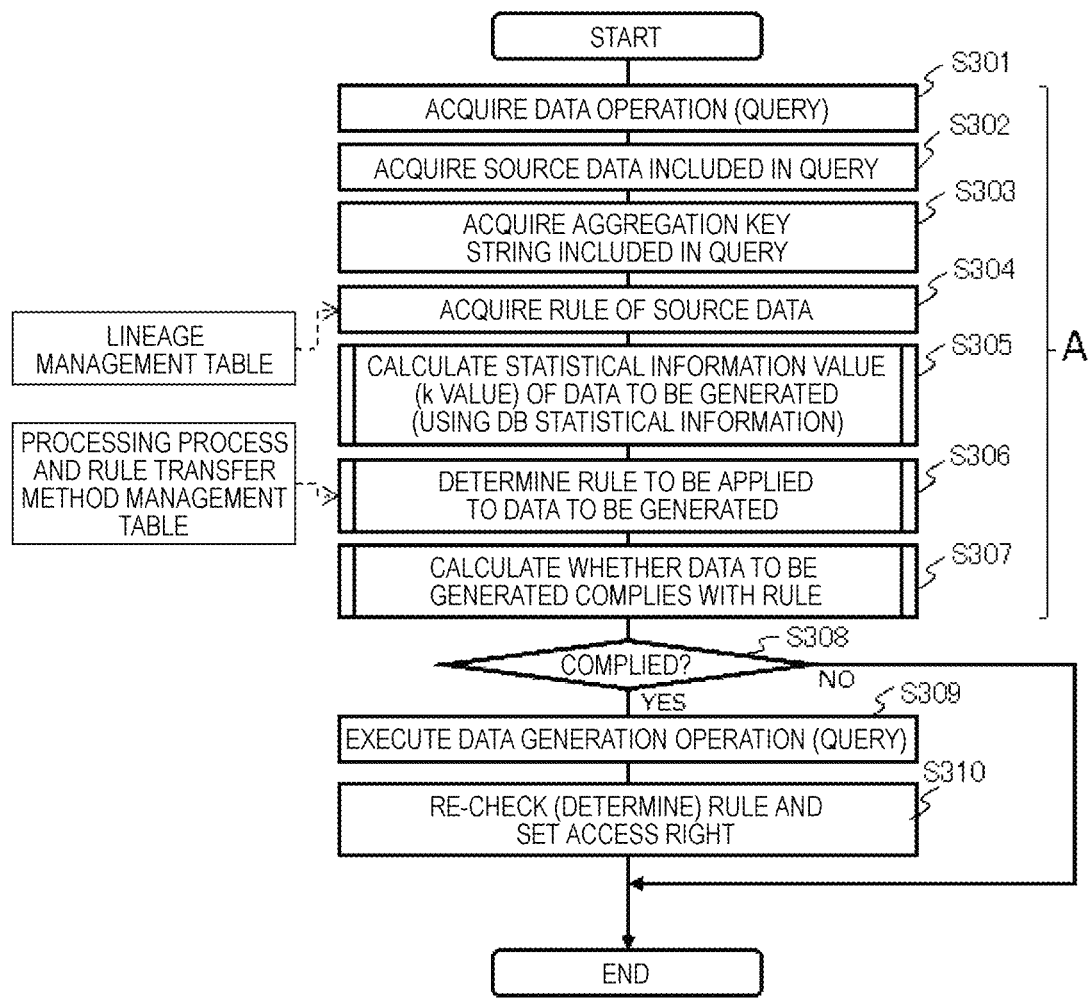
FIG. 9 is a flowchart illustrating an example of processing executed by a query execution and rule compliance determination unit of a data processing server.
Figure 10:
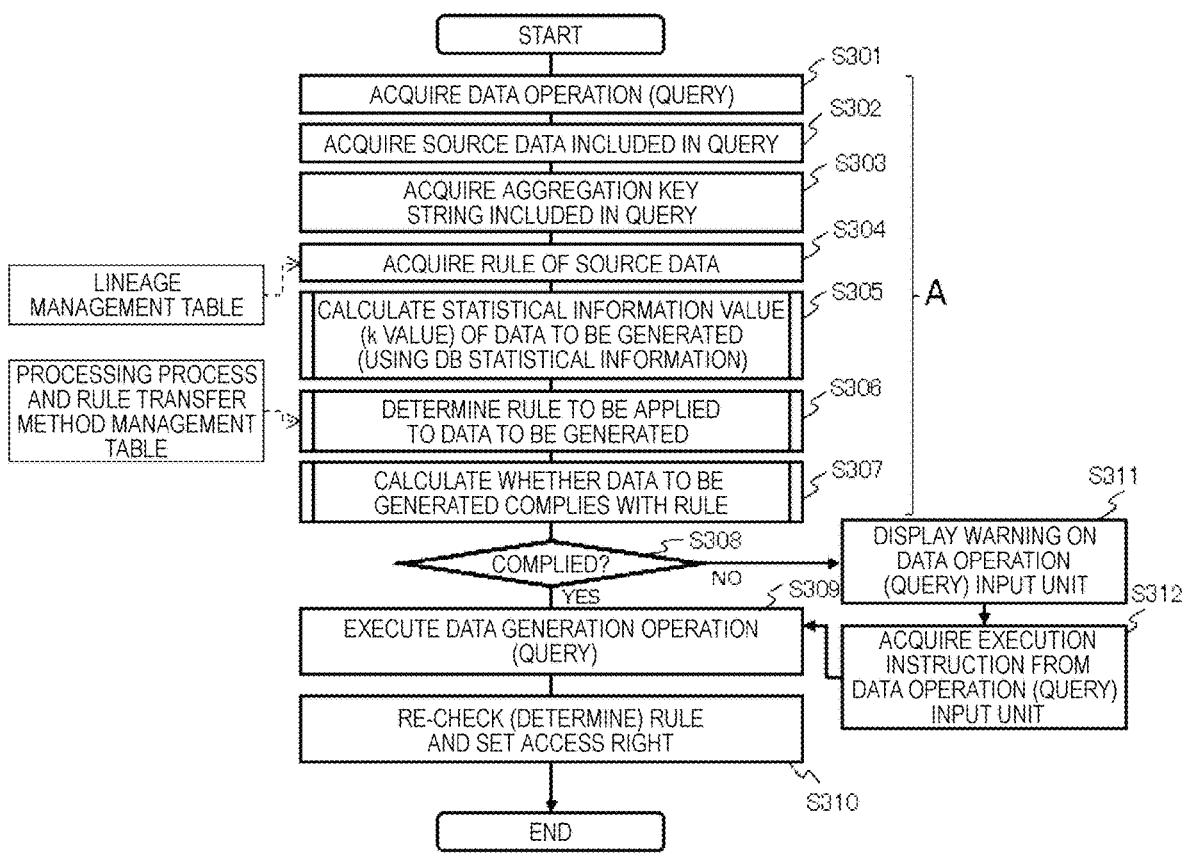
FIG. 10 is a flowchart illustrating the processing of a second program executed by the query execution and rule compliance determination unit.

FIG. 10 is a flowchart illustrating another processing content (second program) executed by the query execution and rule compliance determination unit 31 of the data processing server 3. In the flowchart of FIG. 10, since the processing group A from step S301 to step S307 and the processing contents of steps S309 and S310 described above in FIG. 9 are the same, the same step numbers are assigned and the description thereof will be omitted.

In step S308, the query execution and rule compliance determination unit 31 determines whether the data to be generated (secondary data) complies with the rule.

Here, when the query execution and rule compliance determination unit 31 determines that the data to be generated complies with the rule (step S308, YES), the process of step S309 and step S310 is performed in the same manner as described above to issue the access right to the user and end the process.

On the other hand, when the query execution and rule compliance determination unit 31 determines that the data to be generated does not comply with the rule (step S308, NO), the process proceeds to step S311.

In step S311, the query execution and rule compliance determination unit 31 displays a warning on the data operation (query) input unit 101 of the client terminal 100 described above in FIG. 1 (described later in FIG. 27). In the following step S312, the query execution and rule compliance determination unit 31 monitors the signal (user's instruction) output from the data operation (query) input unit 101 of the client terminal 100. Here, when the query execution and rule compliance determination unit 31 acquires an execution instruction from the data operation (query) input unit 101 of the client terminal 100, the processes of steps S309 and S310 are performed to issue the access right to the user and end the process.

<Third Program>

Figure 11:
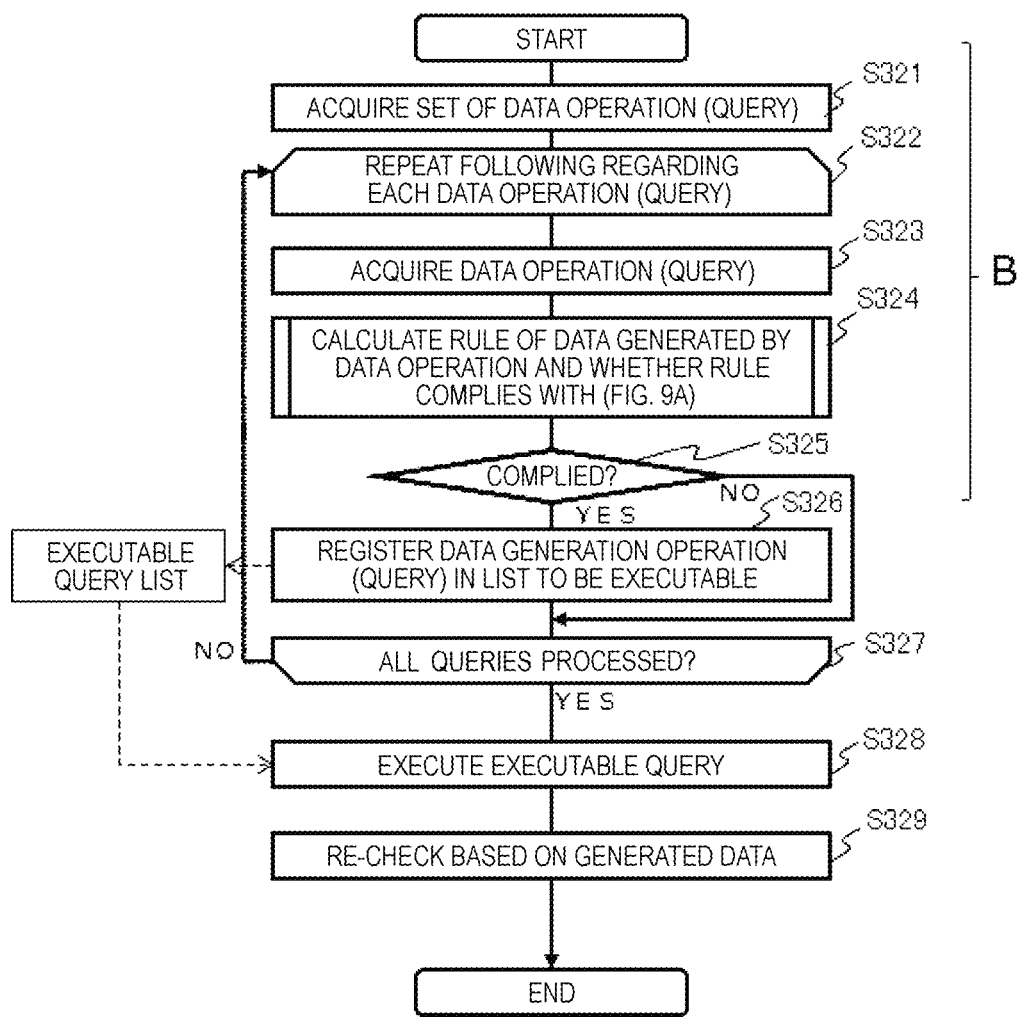
FIG. 11 is a flowchart illustrating processing of a third program executed by the query execution and rule compliance determination unit.

FIG. 11 is a flowchart illustrating the processing contents of yet another program (third program) executed by the query execution and rule compliance determination unit 31 of the data processing server 3.

In step S321, the query execution and rule compliance determination unit 31 acquires the user's data operation (query) transmitted from the client terminal 100 in the same manner as in step S301 described above. However, in step S321, it is assumed that the query execution and rule compliance determination unit 31 has acquired a plurality of (one set) queries. In step S321, it is assumed that the acquired plurality of queries are queries that are independent of each other, in other words, that can obtain the same result even if the execution order is changed (see FIG. 25 as appropriate).

Here, the query execution and rule compliance determination unit 31 shifts to the repetition mode (S322) in which the processing for each data processing (query) constituting the set is repeatedly performed, and repeatedly executes the processes of the following steps S323 to S327 for each query.

In step S323, the query execution and rule compliance determination unit 31 acquires one piece of data processing (query) that has not yet been processed.

In step S324, the query execution and rule compliance determination unit 31 calculates the rules of the data generated by the acquired data processing (query) and whether the generated data complies with the rules. Since such processing corresponds to a part (S302 to S307) of the processing group A described above in FIG. 9, the description thereof will be omitted.

In step S325, the query execution and rule compliance determination unit 31 determines whether the data to be generated (secondary data) complies with the rule.

Here, when the query execution and rule compliance determination unit 31 determines that the data to be generated complies with the rule (step S325, YES), it is determined that the data to be generated should be provided to the user and the process proceeds to step S326. Then, in step S326, the query execution and rule compliance determination unit 31 registers the data processing (query) as an executable query in a list (hereinafter, referred to as "executable query list") (see FIG. 11), and then, the process proceeds to step S327.

On the other hand, when the query execution and rule compliance determination unit 31 determines that the data to be generated does not comply with the rule (step S325, NO), it is determined that access to the user should not be permitted, step S326 described above is skipped, and the process proceeds to step S327.

In step S327, the query execution and rule compliance determination unit 31 determines whether all the queries have been processed for the set of queries acquired in step S321 described above.

Here, when the query execution and rule compliance determination unit 31 determines that all the queries have been processed (steps S327, YES), the process proceeds to step S328.

On the other hand, when the query execution and rule compliance determination unit 31 determines that all the queries have not been processed yet (step S327, NO), the process returns to step S322 and the processes of steps S323 to S327 described above are repeated.

In step S328, the query execution and rule compliance determination unit 31 executes an executable query, that is, a query registered in the above-mentioned executable query list.

In step S329, the query execution and rule compliance determination unit 31 re-checks the presence of rule compliance based on the generated data, and then ends the process.

According to the processing example, only the query determined to be an executable query is selectively executed (step S328). In order to ensure its handling as sensitive data, after re-checking whether the data generated by such selective execution complies with predetermined rules (step S329), the data generated by such selective execution is provided to the user (the operator of the client terminal 100).

As such, it is possible to reduce or minimize the data preparation man-hours with the configuration in which the data operation (query) is not executed for the data estimated not to satisfy the predetermined handling rule.

<Fourth Program>

Figure 12:
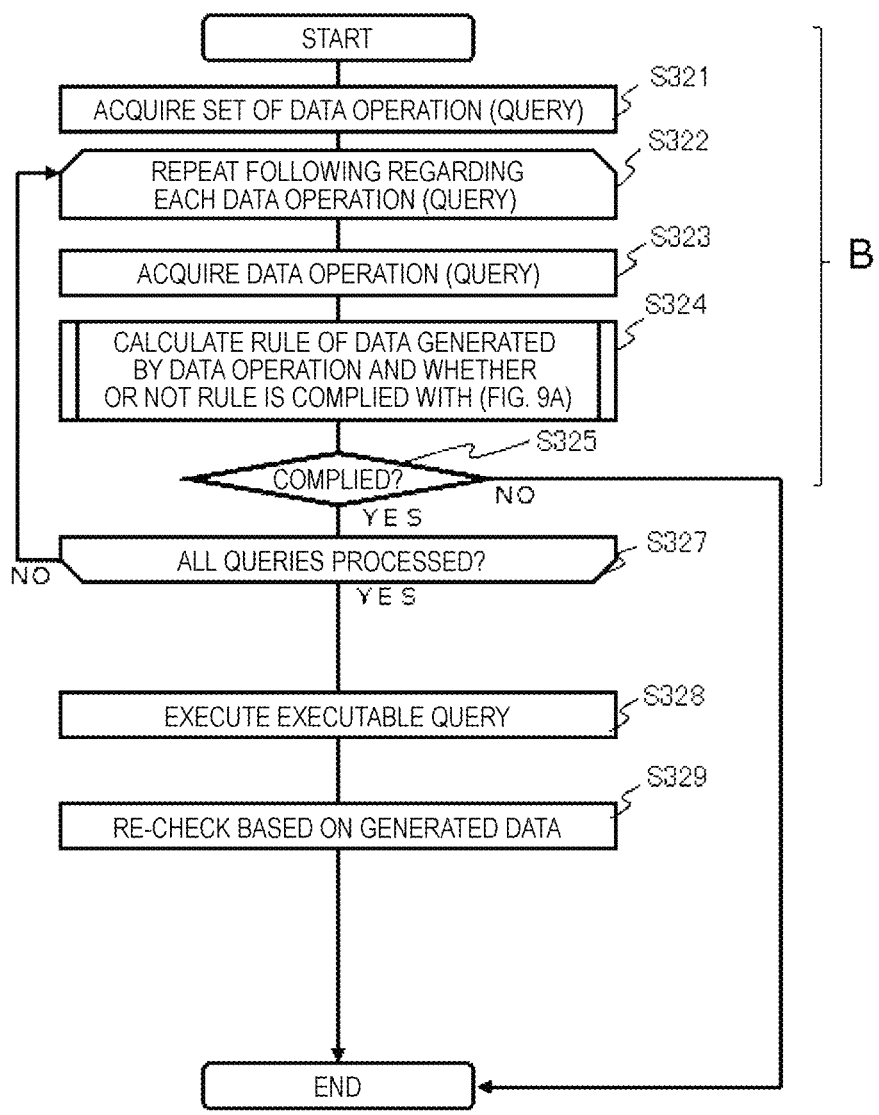
FIG. 12 is a flowchart illustrating processing of a fourth program executed by the query execution and rule compliance determination unit.

FIG. 12 is a flowchart illustrating the processing contents of yet another processing example (fourth program) executed by the query execution and rule compliance determination unit 31 of the data processing server 3.

In the flowchart of FIG. 12, since the processing group B from step S321 to step S324 and the processing contents of steps S328 and S329 described above in FIG. 11 are the same or similar the same step numbers are assigned and the description thereof will be omitted as appropriate.

In step S321, the query execution and rule compliance determination unit 31 acquires a plurality of (one set) queries transmitted from the client terminal 100 and input by the user, as in the case of FIG. 11 described above. Unlike the case of FIG. 11, here, it is assumed that the plurality of queries are a set of queries that different results will be obtained (the same result will not be obtained) when the acquired plurality of queries are queries that constitute a data flow, in other words, if the execution order is changed (see FIG. 26 as appropriate).

Therefore, as can be seen in comparison with FIG. 11, in the flowchart shown in FIG. 12, the process of step S326 described above (that is, the process of registering the executable query in the list) is not performed. In the flowchart shown in FIG. 12, the process performed after the determination in step S325 described above has the following flow.

In step S325, the query execution and rule compliance determination unit 31 determines whether the data to be generated complies with the rule.

Here, when the query execution and rule compliance determination unit 31 determines that the data to be generated complies with the rule (step S325, YES), it is determined that the data to be generated should be provided to the user, and the process proceeds to the determination process of step S327 described above.

In step S327, the query execution and rule compliance determination unit 31 determines whether all the queries have been processed for the set of queries acquired in step S321 described above.

Then, in the same manner as described above, when the query execution and rule compliance determination unit 31 determines that all the queries have been processed (steps S327, YES), the process proceeds to step S328. On the other hand, when the query execution and rule compliance determination unit 31 determines that all the queries have not been processed yet (step S327, NO), the process returns to step S322, and the processes of steps S323 to S327 described above are repeated.

In step S328, the query execution and rule compliance determination unit 31 executes the executable queries, here, all the queries determined to be YES in step S325 described above as executable queries.

In step S329, the query execution and rule compliance determination unit 31 re-checks the presence of rule compliance based on the generated data, and then ends the process.

On the other hand, in step S325, when the query execution and rule compliance determination unit 31 determines that the data to be generated does not comply with the rule (step S325, NO), it is determined that access to the user should not be permitted, and then, steps S327 to S329 described above are performed to end a series of processes.

As described above, in the processing example shown in FIG. 12, unlike the example in FIG. 11, in the case where there was even one query in the set of data operations (queries) that was presumed not to comply with the predetermined rule, even if it is estimated that all other queries comply with the rules, the entire set of queries will not be executed and the data will not be provided to the user. As a result, in the present embodiment, it is possible to strengthen the protection of sensitive data.

As in the other examples, the data preparation man-hours can be reduced or minimized by not executing the data operation (query) for the data estimated not to satisfy the predetermined handling rule.

<Fifth Program>

Figure 13:
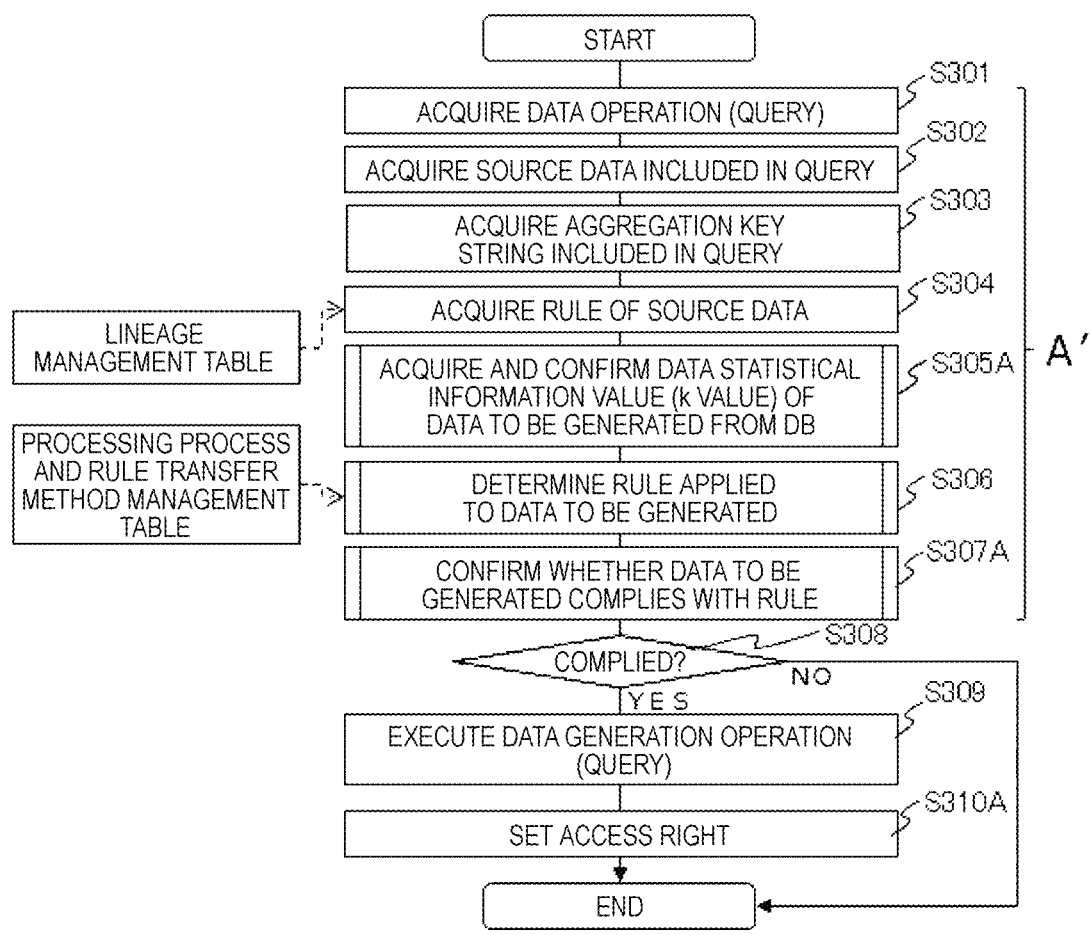
FIG. 13 is a flowchart illustrating processing of a fifth program executed by the query execution and rule compliance determination unit.

FIG. 13 is a flowchart illustrating the processing content of yet another example (fifth program) executed by the query execution and rule compliance determination unit 31 of the data processing server 3.

In the flowchart of FIG. 13, since a part of the processes constituting the processing group A (steps S301 to S307) described above in FIG. 9 is different, the corresponding series of processes is described as the processing group A' and different processes are given similar step numbers.

In step S305A following step S304 described above, the query execution and rule compliance determination unit 31 obtains and confirms the statistical information value (k value) of the generated data from the statistical information 23 of the DB in the database management server 2, and the process proceeds to step S306 described above.

In step S307A following step S306 (determination of the rule to be applied) described above, the query execution and rule compliance determination unit 31 executes pre-processing for checking whether the data to be generated (secondary data) complies with the rule.

The processing contents of step S308 (branching of processing based on the determination and the determination result) and step S309 (execution of query) following step S307A are the same as described above.

In step S310A following step S309 described above, the query execution and rule compliance determination unit 31 sets the user's access right for the data generated by the executed query in the same manner as described above (rule re-checking is not performed). After that, the query execution and rule compliance determination unit 31 ends a series of processes.

Thus, the user can access the data by the process (for example, "viewing") input through the data operation (query) input unit 101 of the client terminal 100.

According to such a processing example, the processing is simplified as compared with the flow of FIG. 9, and the data preparation man-hours can be further reduced.

<Sixth Program>

Figure 14:
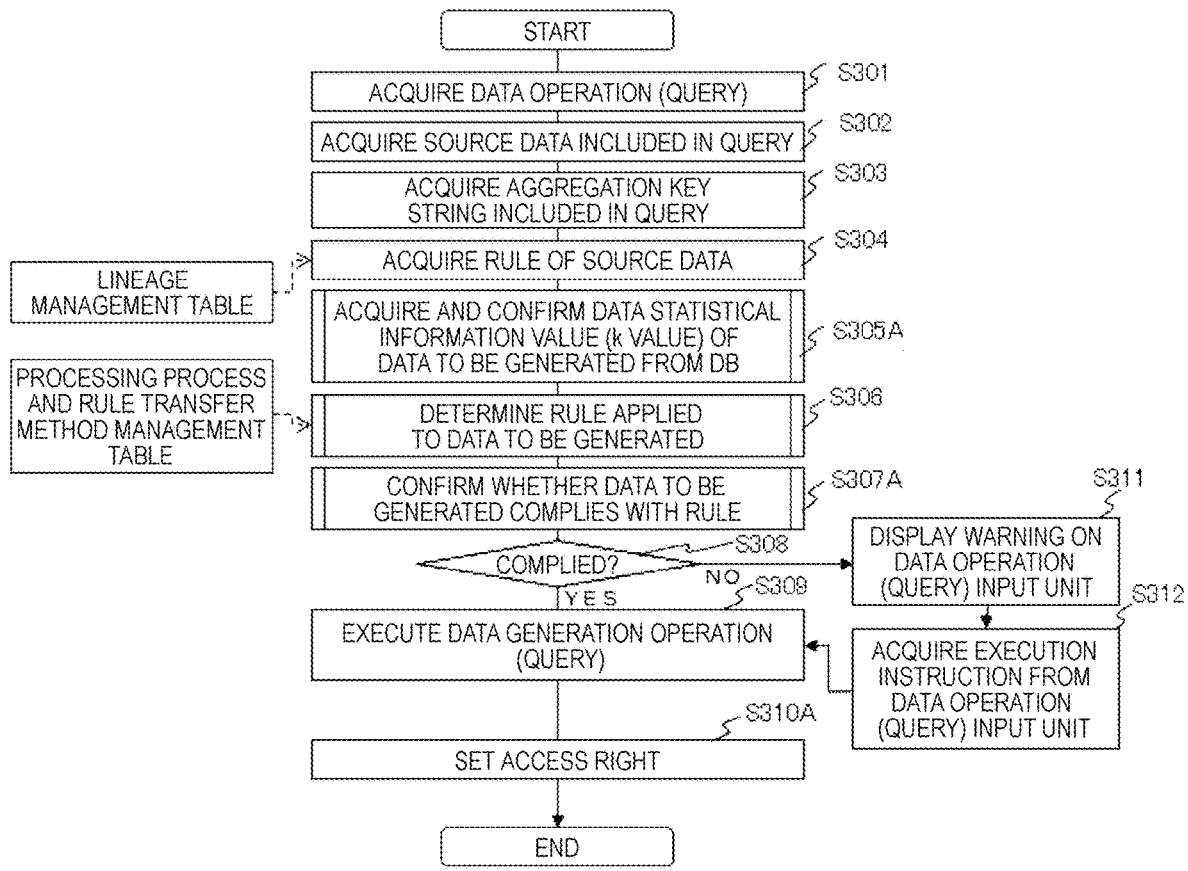
FIG. 14 is a flowchart illustrating processing of a sixth program executed by the query execution and rule compliance determination unit.

FIG. 14 is a flowchart illustrating the processing content of yet another example (sixth program) executed by the query execution and rule compliance determination unit 31 of the data processing server 3.

The same processes as those described above in FIGS. 9 to 13 are given the same step numbers and the description thereof will be omitted as appropriate.

As can be seen by comparison with FIGS. 9 to 13, as appropriate, in general, the flowchart shown in FIG. 14 has the same processes from the start to step S307A and the process of the final step S310A as in the example of FIG. 13. In the flowchart shown in FIG. 14, the processing (steps S311 and S312) after the determination of NO in step S308 is the same as the example shown in FIG. 10.

<Seventh Program>

Figure 15:
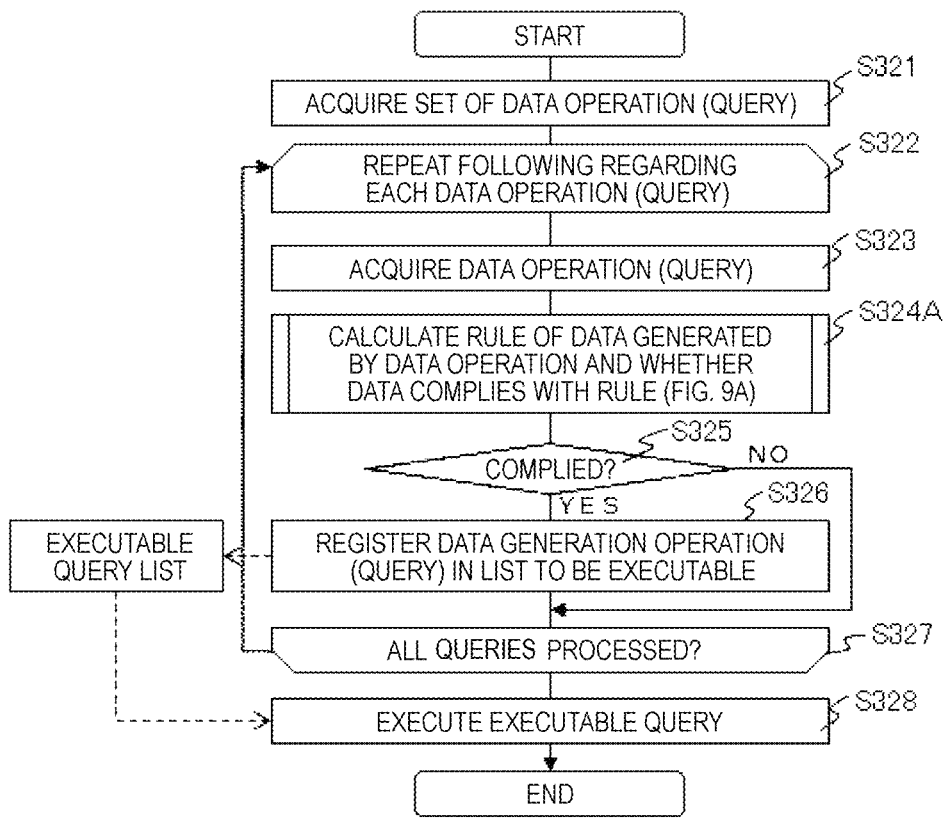
FIG. 15 is a flowchart illustrating processing of a seventh program executed by the query execution and rule compliance determination unit.

FIG. 15 is a flowchart illustrating the processing content of yet another example (seventh program) executed by the query execution and rule compliance determination unit 31 of the data processing server 3.

The processes from steps S321 to S323 are the same as those of the third program described above in FIG. 11.

In the following step S324A, the query execution and rule compliance determination unit 31 performs pre-processing (calculation) for determining a rule of the data generated by the acquired data processing (query) and whether the generated data complies with the rule. Specifically, in step S324A, the query execution and rule compliance determination unit 31 executes the processes of steps S302 to S307 described above in FIG. 9, and the process proceeds to step S325.

In step S325, the query execution and rule compliance determination unit 31 determines whether the data to be generated complies with the rule.

Here, when the query execution and rule compliance determination unit 31 determines that the data to be generated complies with the rule (step S325, YES), it is determined that the data to be generated should be provided to the user, and the process proceeds to step S326. Then, in step S326, the query execution and rule compliance determination unit 31 registers the data processing (query) as an executable query in the executable query list (see FIG. 15), and then the process proceeds to step S327.

On the other hand, when the query execution and rule compliance determination unit 31 determines that the data to be generated does not comply with the rule (step S325, NO), it is determined that access to the user should not be permitted, and step S326 described above is skipped, and the process proceeds to step S327.

In step S327, the query execution and rule compliance determination unit 31 determines whether all the queries have been processed for the set of queries acquired in step S321 described above.

Here, when the query execution and rule compliance determination unit 31 determines that all the queries have been processed (steps S327, YES), the process proceeds to step S328.

On the other hand, when the query execution and rule compliance determination unit 31 determines that all the queries have not been processed yet (step S327, NO), the process returns to step S322, and the processes of steps S323 to S327 described above are repeated.

In step S328, the query execution and rule compliance determination unit 31 executes an executable query, that is, a query registered in the above-mentioned executable query list, and ends a series of processes.

According to such a processing example, the data preparation man-hours can be further reduced because the processing (re-check) of S329 is not performed as compared with the flow of FIG. 11.

<Eighth Program>

Figure 16:
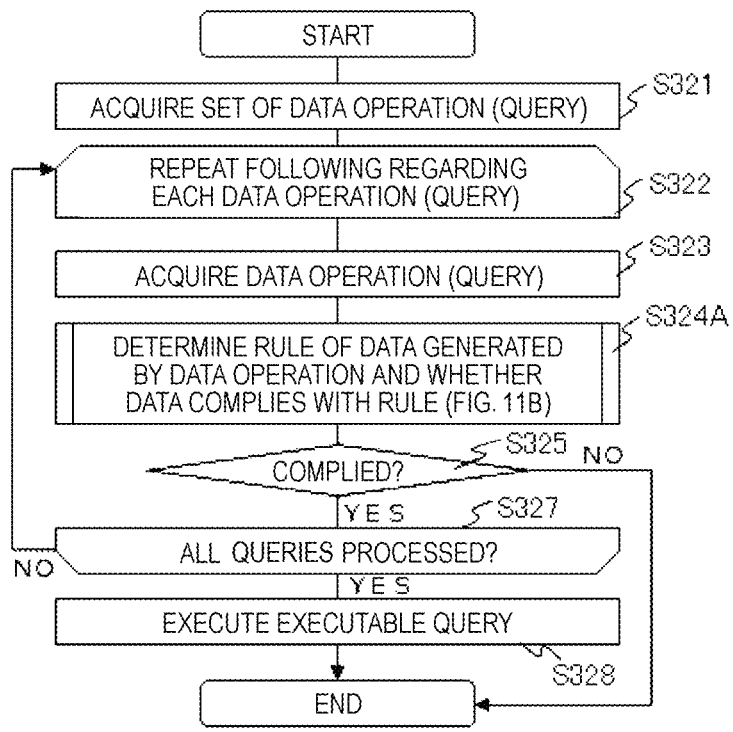
FIG. 16 is a flowchart illustrating the processing of an eighth program executed by the query execution and rule compliance determination unit.

FIG. 16 is a flowchart illustrating the processing content of yet another example (eighth program) executed by the query execution and rule compliance determination unit 31 of the data processing server 3.

As can be seen in comparison with FIG. 15, in the example shown in FIG. 16, the process of step S326 (registration of the query in the executable query list) is omitted. Therefore, it is possible to further reduce or minimize the data preparation man-hours.

<Calculation Processing of Rule Compliance>

Figure 17:
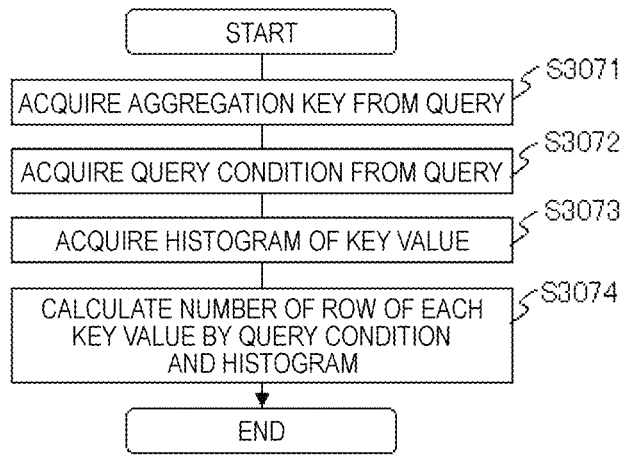
FIG. 17 is a flowchart showing an example of a process of calculating whether secondary data complies with a rule.

FIG. 17 is a flowchart showing a flow of processing for calculating whether data complies with the rules, which is executed by the query execution and rule compliance determination unit 31 of the data processing server 3. Such a flowchart corresponds to the subroutine in step S307 of FIG. 9. In order to facilitate understanding, see FIG. 24 and the like as appropriate.

In step S3071, the query execution and rule compliance determination unit 31 acquires the aggregation key (in the example of FIG. 24, the aggregation key consisting of three key values of k1, k2, and k3) included in the query sent from the client terminal 100.

In step S3072, the query execution and rule compliance determination unit 31 acquires the conditions (query conditions) included in the above query. As the query condition, each processing condition when processing the source data is performed, for example, an extraction condition when extracting data from the source data, and a combination condition when data of the source data (two or more pieces of information) are combined, and the like can be mentioned.

In step S3073, the query execution and rule compliance determination unit 31 refers to the DB statistical information 23 of the database management server 2 and acquires a histogram of the key values in the database 22.

In step S3074, the query execution and rule compliance determination unit 31 calculates the number of rows (k value or else) for each key from the query conditions and the histogram acquired in step S3072 and step S3073, saves the calculation result, and ends a series of processes.

<Check Processing of Rule Compliance>

Figure 18:
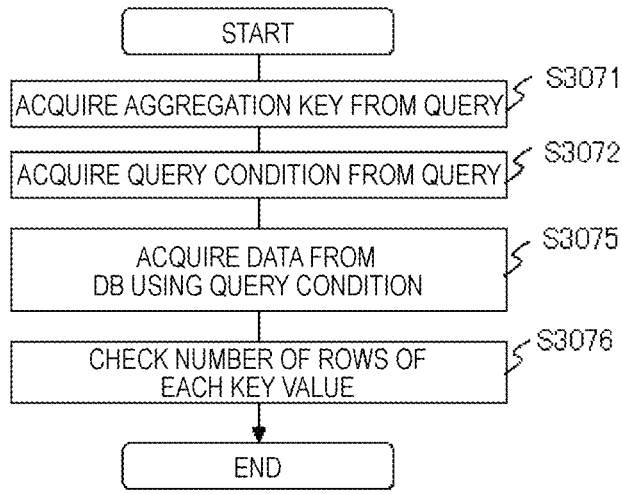
FIG. 18 is a flowchart showing an example of a process for confirming whether the secondary data complies with the rule.

FIG. 18 is a flowchart showing a flow of processing for checking whether the secondary data complies with the rule, which is executed by the query execution and rule compliance determination unit 31 of the data processing server 3. Such a flowchart corresponds to the subroutine in step S307A of FIG. 13. In order to facilitate understanding, see FIG. 24 and the like as appropriate.

As described above in FIG. 17, the query execution and rule compliance determination unit 31 acquires the aggregation key from the query (step S3071) and subsequently acquires the query condition (step S3072).

In the following step S3075, the query execution and rule compliance determination unit 31 acquires the corresponding data from the database 22 of the database management server 2 by using the query conditions acquired in the previous step.

In step S3076, the query execution and rule compliance determination unit 31 checks the number of rows (k value or else) for each key value of the data acquired in the previous step.

<Processing of Determining Whether Rule Transfer is Necessary>

Figure 19:
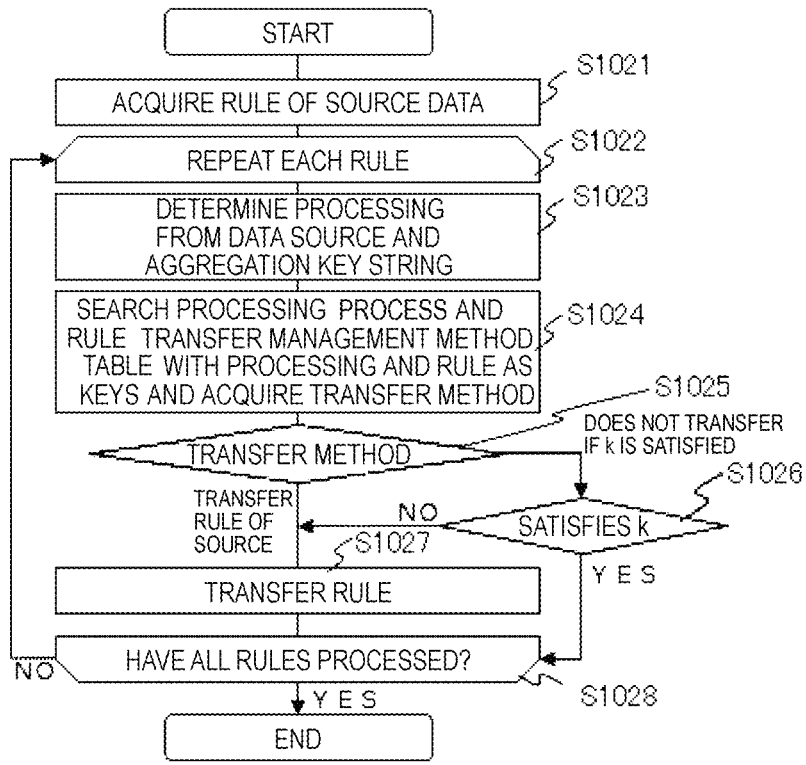
FIG. 19 is a flowchart showing an example of a rule transfer necessity determination process for source data.

FIG. 19 is a flowchart showing an example of processing of determining whether it is necessary to transfer the rule of the source data when the secondary data is generated.

In step S1021, the query execution and rule compliance determination unit 31 acquires the rules of the source data constituting the secondary data (that is, all the rules applied to the source data included in the generated secondary data).

After that, the query execution and rule compliance determination unit 31 repeats the processes of steps S1022 to S1028 relating to the acquired source data rules, and when the processes of steps S1023 to S1028 for all such rules are completed, the query execution and rule compliance determination unit 31 ends the processing of the routine.

Specifically, in step S1022, the query execution and rule compliance determination unit 31 acquires any one of the rules acquired in the previous step that has not yet been checked and performs the following processing.

In step S1023, the query execution and rule compliance determination unit 31 specifies or determines the processing process (type of data processing to be executed) from the data source specified by the query (for example, whether it is NDB or KDB) and the aggregation key string (see FIG. 24 or the like as appropriate).

In step S1024, the query execution and rule compliance determination unit 31 searches the processing process and rule transfer method management table 34 using one rule acquired in step S1022 and the processing process (type of data processing) specified (determined) in the previous step as keys to acquire the transfer method (see FIG. 7 as appropriate).

In step S1025, the query execution and rule compliance determination unit 31 determines whether to transfer the source rule based on the acquired transfer method, and executes processing according to the determination result. In one specific example, if the query execution and rule compliance determination unit 31 determines not to transfer the source rule when k (predetermined k value) is satisfied, the process proceeds to step S1026 and if it is determined to transfer the source rule, the process proceeds to step S1027.

In step S1026, the query execution and rule compliance determination unit 31 determines whether the rule satisfies k (k value), and if it is determined that k is not satisfied (NO), the process proceeds to step S1027 and if k is satisfied (YES), the process is skipped in step S1028.

In step S1027 after it is determined that the source rule is to be transferred, the query execution and rule compliance determination unit 31 sets to transfer the rule and proceeds to step S1028.

In step S1028, the query execution and rule compliance determination unit 31 determines whether all the rules acquired in step S1021 have been processed, and if it is determined that the processing has not been performed (NO), the process returns to step S1022 and the above-mentioned process is repeated, and if it is determined that the processing has been performed (YES), a series of processes is ended.

Figure 20:
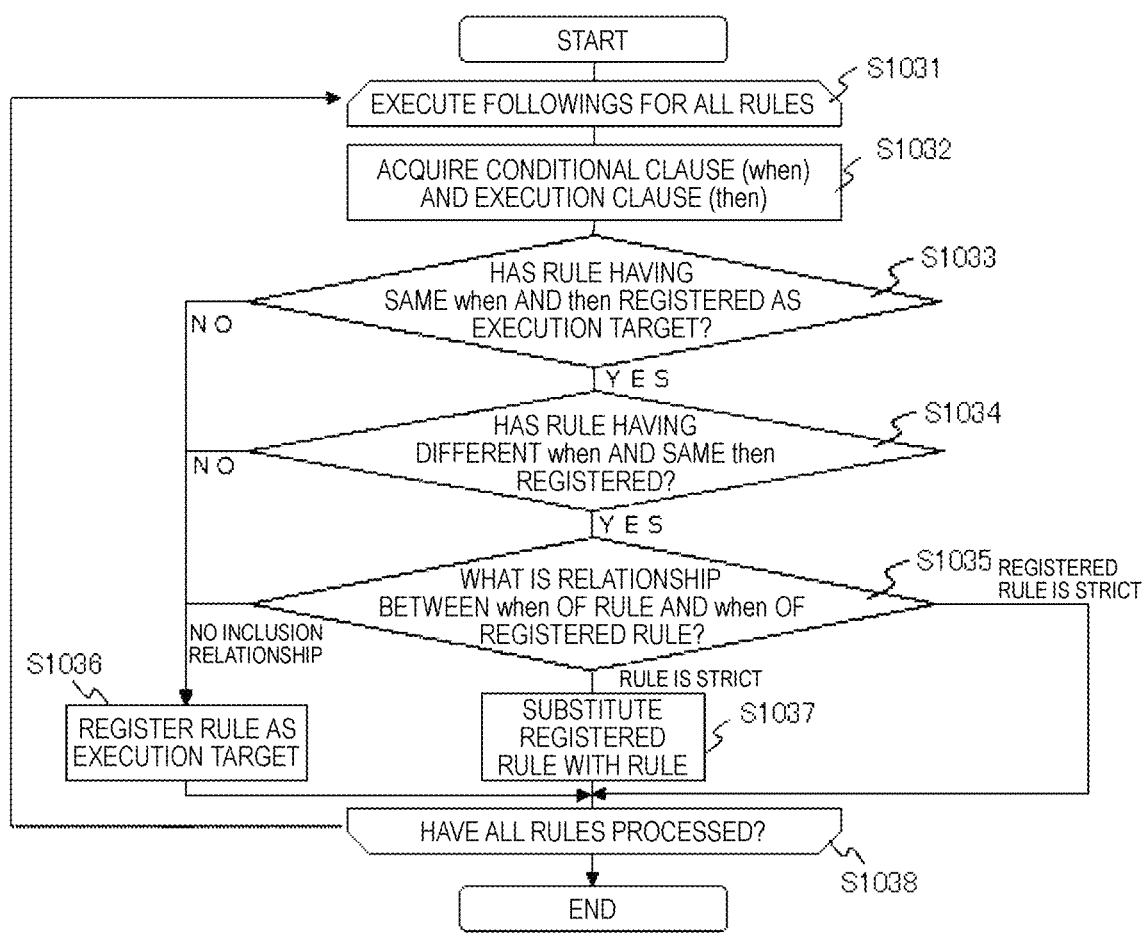
FIG. 20 is a flowchart showing an example of the rule transfer necessity determination process.

FIG. 20 is a flowchart showing an example of processing of registering all the rules applied to the generated secondary data, which is executed by the query execution and rule compliance determination unit 31 of the data processing server 3.

In general, the query execution and rule compliance determination unit 31 performs the processes of steps S1031 to S1038 for one of all the rules corresponding to the source data included in the secondary data, and when the processing is completed for all the rules, the processing of the routine is ended.

Specifically, the query execution and rule compliance determination unit 31 acquires any one of the above rules in step S1031 and executes the following processing.

In step S1032, the query execution and rule compliance determination unit 31 acquires the conditional clause (when) and the execution clause (then) of the rule.

For example, in the case of the rule R4 described above in FIG. 6, "when the app (application) is not XXX" is a conditional clause (where), and "prohibition of access to data that does not satisfy the k value" is an execution clause (then). Alternatively, as described above in FIG. 7, in the rule for the processing process "aggregation", the conditional clause (where) corresponds to "(the case of) rules R1 to R3, and R5" or "(the case where) R4 satisfies the predetermined k value)". Accordingly, the rules for the processing process "AI model construction" are the same.

In step S1033, the query execution and rule compliance determination unit 31 determines whether a rule having the same acquired conditional clause (where) and execution clause (then) has already been registered as an execution target. Here, when it is determined that the rule has not been registered yet (step S1033, NO), the query execution and rule compliance determination unit 31 skips to step S1036. On the other hand, when the query execution and rule compliance determination unit 31 determines that the above rule has already been registered (step S1033, YES), the process proceeds to step S1034.

In step S1034, the query execution and rule compliance determination unit 31 determines whether a rule that is different (does not match) from the conditional clause (where) acquired in step S1032 but has the same execution clause (then) has already been registered as an execution target. Here, when it is determined that the rule has not been registered yet (step S1034, NO), the query execution and rule compliance determination unit 31 skips to step S1036. On the other hand, when the query execution and rule compliance determination unit 31 determines that the above rule has already been registered (step S1034, YES), the process proceeds to step S1035.

In step S1035 after it is determined that a rule having different conditional clauses (where) and the same execution clause (then) is registered, the query execution and rule compliance determination unit 31 inspects for the inclusion relationship (one rule is stricter) of the conditional clauses (the conditional clauses) of these two rules, and the process proceeds to the processing step according to the inspection result.

Specifically, if there is no inclusion relationship between the rule acquired in step S1031 (hereinafter referred to as "the rule") and the already registered rule (hereinafter referred to as "registered rule"), the query execution and rule compliance determination unit 31 registers the rule as an execution target in step S1036, and the process proceeds to step S1038.

Here, the case where there is no inclusion relationship of the conditional clause (where) includes, for example, "(the case of) rules R1 to R3, and R5" or "(the case where) R4 satisfies the predetermined k value" for the processing process "aggregation" described in FIG. 7.

When the condition of the rule is stricter than that of the registered rule, the query execution and rule compliance determination unit 31 performs a process of replacing the registered rule, which has already been registered, with the (stricter) rule (step S1037), and the process proceeds to step S1038.

On the other hand, if the registered rule has stricter conditions than the rule, the query execution and rule compliance determination unit 31 determines that it is not necessary to newly register the rule, and skips to step S1038.

In step S1038, the query execution and rule compliance determination unit 31 determines whether all the rules have been processed. Then, when the query execution and rule compliance determination unit 31 determines that the processing for all the rules has not been processed yet (step S1038, NO), the process returns to step S1031 and each of the above-described processes is repeated. On the other hand, when it is determined that the processing for all the rules has been performed (step S1038, YES), the query execution and rule compliance determination unit 31 ends the routine.

By performing the above processing, it is possible to reduce the man-hours for data preparation while strengthening the management of sensitive data.

Figure 21:
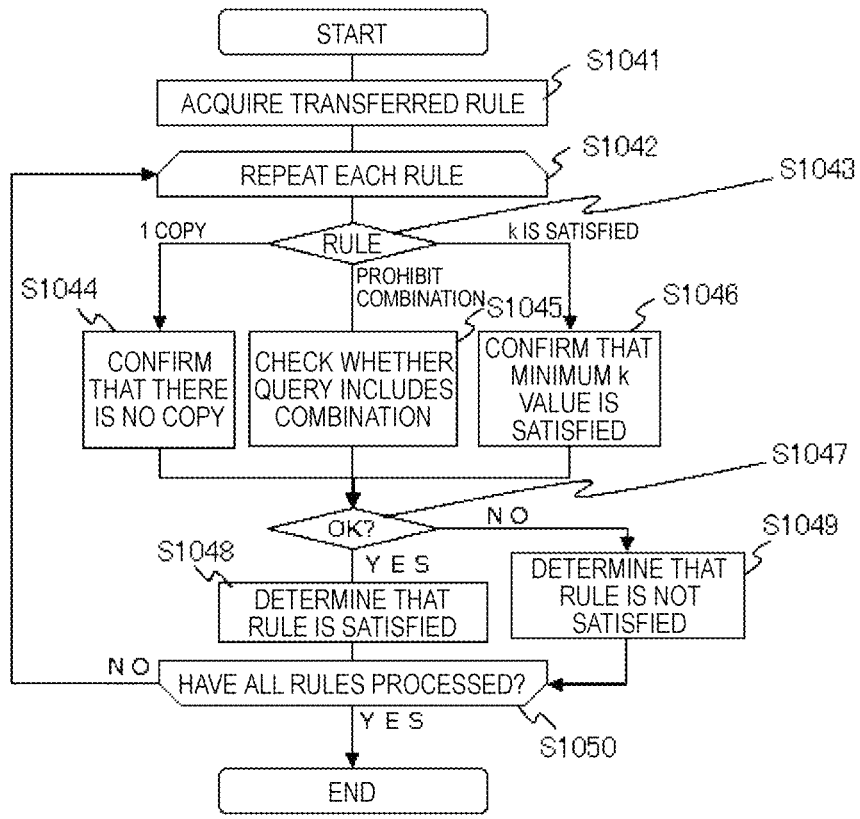
FIG. 21 is a flowchart showing a flow of processing for confirming whether the secondary data complies with the rule.

FIG. 21 is a flowchart showing a flow of processing for checking whether the secondary data complies with the rules, which is executed by the query execution and rule compliance determination unit 31 of the data processing server 3. In the present example, it is assumed that the secondary data is NDB data (see FIG. 6).

In step S1041, the query execution and rule compliance determination unit 31 acquires all the rules transferred by the generated secondary data (for example, a combination of source data information), and shifts to the check mode of step S1042 and the subsequent steps.

After that, the query execution and rule compliance determination unit 31 repeats the processes of steps S1042 to S1050 related to the transferred rule, and ends the process of the routine when all the processes are completed.

Specifically, in step S1042, the query execution and rule compliance determination unit 31 acquires any rule from all the transferred rules. In the present example, any one of the rules R1, R2, and R3 described above in FIG. 6 is acquired.

In the following step S1043, the query execution and rule compliance determination unit 31 checks the content of the rule acquired in the previous step (here, which of R1, R2, and R3 is the rule). Then, the query execution and rule compliance determination unit 31 proceeds to step S1044 when the acquired rule is R1, proceeds to step S1045 when R2, and proceeds to step S1046 when R3.

In step S1044 when the acquired rule is R1, the query execution and rule compliance determination unit 31 confirms that a copy that deviated from the rule (here, 2 or more) is not included in the generated secondary data (here, a combination of source data information), and the process proceeds to step S1047.

In step S1045 when the acquired rule is R2, the query execution and rule compliance determination unit 31 checks whether the matching (combination) with other information is included in the query that is the source of the generated secondary data (here, a combination of source data information), and the process proceeds to step S1047. Here, the matching (combination) with other information is, for example, a combination of two or more pieces of information ("last name"+"first name", "Hospital"+"Hospital visit date"+"Illness name" or else) that makes it easy to identify a specific individual, facility name, place, and the like.

In step S1046 when the acquired rule is R3, the query execution and rule compliance determination unit 31 confirms that the generated secondary data (in the present example, each information configured) satisfies the minimum k value (here, the fact that the number of pieces of information (k value) to be combined is 4 or more), and the process proceeds to step S1047.

In step S1047, the query execution and rule compliance determination unit 31 checks whether the generated secondary data complies with the rule acquired in step S1042 (whether it is OK). Then, if it is OK (step S1047, YES), the query execution and rule compliance determination unit 31 determines that the rule is satisfied (step S1048), and proceeds to step S1050. On the other hand, if it is not OK (step S1047, NO), the query execution and rule compliance determination unit 31 determines that the rule is not satisfied (step S1049), and proceeds to step S1050.

In step S1050, the query execution and rule compliance determination unit 31 checks whether all the rules acquired in step S1041 (each rule transferred by the secondary data) have been checked, and if YES, the routine shown in FIG. 21 is ended. On the other hand, if NO, the process returns to step S1042 and the above-described process is repeated.

By performing such processing, it is possible to reduce the man-hours for data preparation while strengthening the management of sensitive data when the secondary data is NDB data.

<Setting of Access Right>

Figure 22:
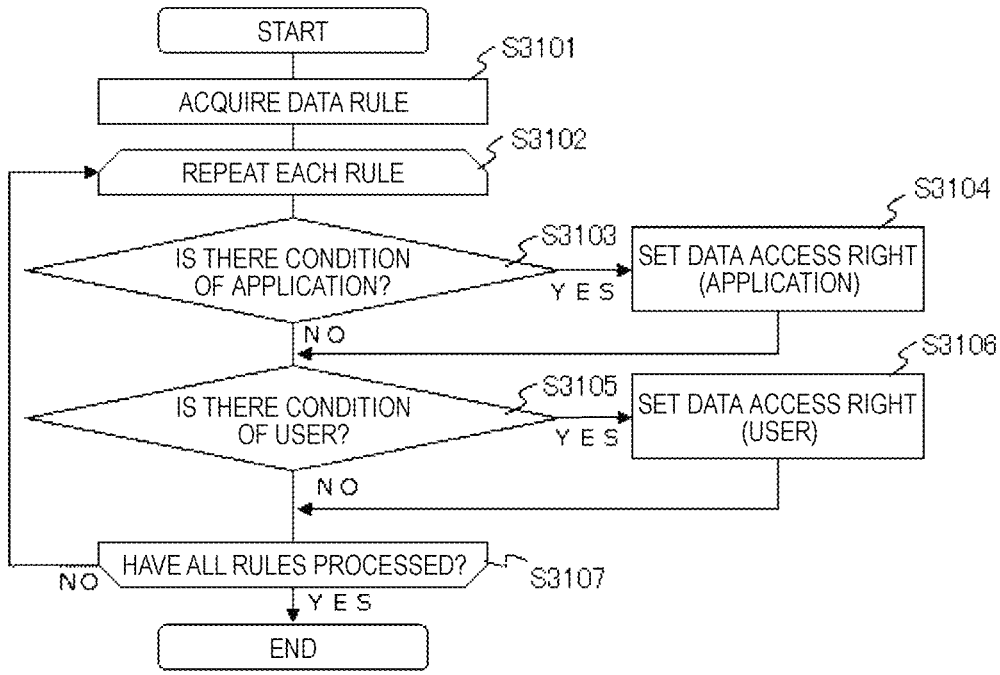
FIG. 22 is a flowchart showing an example of an access right setting process.

FIG. 22 is a flowchart showing an example of the access right setting process executed by the query execution and rule compliance determination unit 31 of the data processing server 3. The flowchart corresponds to the subroutine in step S310 of FIG. 9. In the present example, it is assumed that the secondary data is KDB data (see FIG. 6).

In step S3101, the query execution and rule compliance determination unit 31 acquires the rule of the generated secondary data (here, a combination of source data information).

After that, the query execution and rule compliance determination unit 31 repeats the processes of steps S3102 and subsequent steps (steps S3103 to S3107) related to the acquired rule, and when the series of processing for all the rules is completed, the processing of the routine is ended.

Specifically, the query execution and rule compliance determination unit 31 determines whether there is an application condition for any one rule (a rule for which the determination processing of step S3103 and step S3105 has not been performed yet) (step S3103).

In the above-described example (Rule R4) in FIG. 6, the rule R4 is applied when the application is not the specified one (XXX). Therefore, when the application is the specified one (XXX), the rule R4 is irrelevant.

Here, when the query execution and rule compliance determination unit 31 determines that there is an application condition (step S3103, YES), the process proceeds to step S3104. On the other hand, when the query execution and rule compliance determination unit 31 determines that there is no application condition (step S3103, NO), the process proceeds to step S3105.

In step S3104, the query execution and rule compliance determination unit 31 sets an access right to data (for example, a predetermined command or password) for the application in order to satisfy such a condition.

In step S3105, the query execution and rule compliance determination unit 31 determines whether there is a user condition (for example, whether it is necessary to be an employee of a company) for the rule.

Here, when the query execution and rule compliance determination unit 31 determines that there is a user condition (step S3105, YES), the process proceeds to step S3106. On the other hand, when the query execution and rule compliance determination unit 31 determines that there is no user condition (step S3105, NO), the process proceeds to step S3107.

In step S3106, the query execution and rule compliance determination unit 31 sets the access right to the data (for example, input of the company name and employee number, or the like) for the user in order to satisfy such a condition.

In step S3107, the query execution and rule compliance determination unit 31 determines whether all the rules acquired in step S3101 have been processed. Then, when the query execution and rule compliance determination unit 31 determines that all the processes have not been performed yet (step S3107, NO), the process returns to step S3102, and the processes of step S3103 and the like described above are repeated.

On the other hand, when the query execution and rule compliance determination unit 31 determines that all the processes have been performed (step S3107, YES), the routine is ended.

By performing such processing, it is possible to reduce the man-hours for data preparation while strengthening the management of sensitive data when the secondary data is KDB data.

<Examples of Various Display Screens>

Hereinafter, an example of a display screen displayed on the display unit of the present system will be described with reference to FIGS. 23 to 27. The display screens shown in FIG. 23 and the subsequent drawings are mainly examples of screens displayed on the display unit 1008 of the client terminal 100 but may be configured to be displayed on the display units of other terminals such as the database management server 2 and the data processing server 3.

<Registration Screen for Handling Regulation for the Processing Process and Post-Processing Data>

Figure 23:
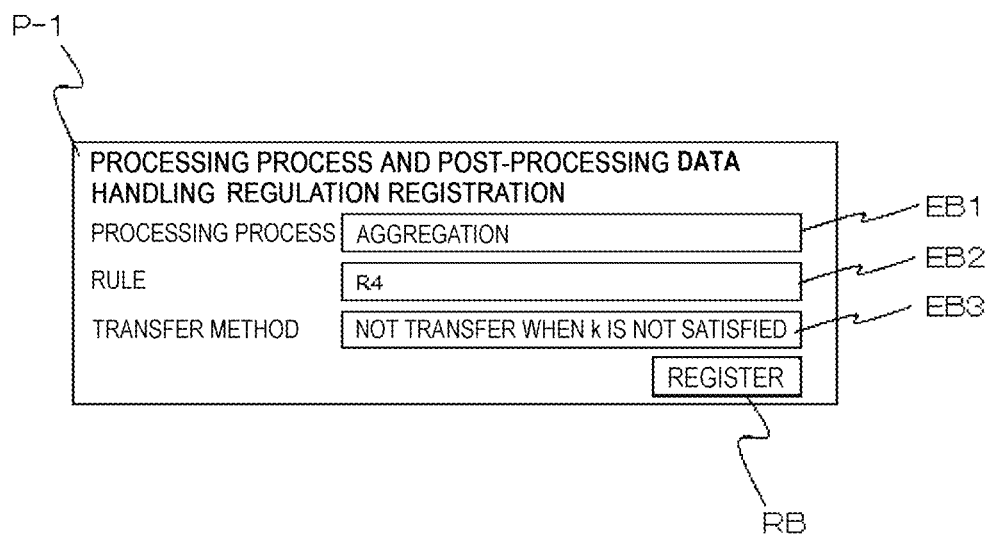
FIG. 23 is a diagram illustrating a specific example of a regulation registration screen for registering regulations regarding processing and post-processing data handling.

FIG. 23 shows a diagram illustrating a specific example of a display screen (hereinafter, also referred to as a regulation registration screen) for registering regulations regarding the handling of the processing process and the post-processing secondary data. In other words, the processing method and rule transfer method management table 34 described with reference to FIG. 7 can be created or updated by repeatedly performing the setting registration process through the regulation registration screen shown in FIG. 23.

As can be understood in comparison with FIG. 7, on the regulation registration screen shown in FIG. 23, input fields (Edit Box) EB1, EB2 and EB3 for setting (inputting) "processing process", "rule", and "transfer method" corresponding to each field of the processing method and rule transfer method management table 34, and a "register" button RB for registering the information input in each of the fields are displayed.

FIG. 23 illustrates that the above-mentioned rule "R4" is applied as a rule when "aggregation" is executed, as a processing process, and the state of the regulation registration screen in which no transfer (then) is input when k (predetermined k value) is satisfied (when), as a transfer method (see FIG. 7 as appropriate).

When the registration button RB is selected from the state shown in FIG. 23, such input information is sent from the client terminal 100 to the data processing server 3, and the processing method and rule transfer method management table 34 is updated.

<Single Data Operation (Query) Input Screen>

FIG. 24 is a diagram showing a specific example of a display screen P-2 (hereinafter, also referred to as an input screen) for inputting a single data operation (query). On the input screen of such a single data operation (query), input fields EB4, EB5, EB6, EB7 and EB8 for setting (inputting) "output column", "output column (aggregate key)", "source data", "source data extraction condition" and "source data combination condition", and an "execute" button ExB for executing the query set in each of the fields are displayed.

When the execution button ExB is selected from the state shown in FIG. 24, such input information is sent from the client terminal 100 to the data processing server 3, and the above-described processing in FIG. 9 and the like is executed on the data processing server 3.

<Multiple Data Operation (Query) Input Screen (Independent Query)>

Figure 25:
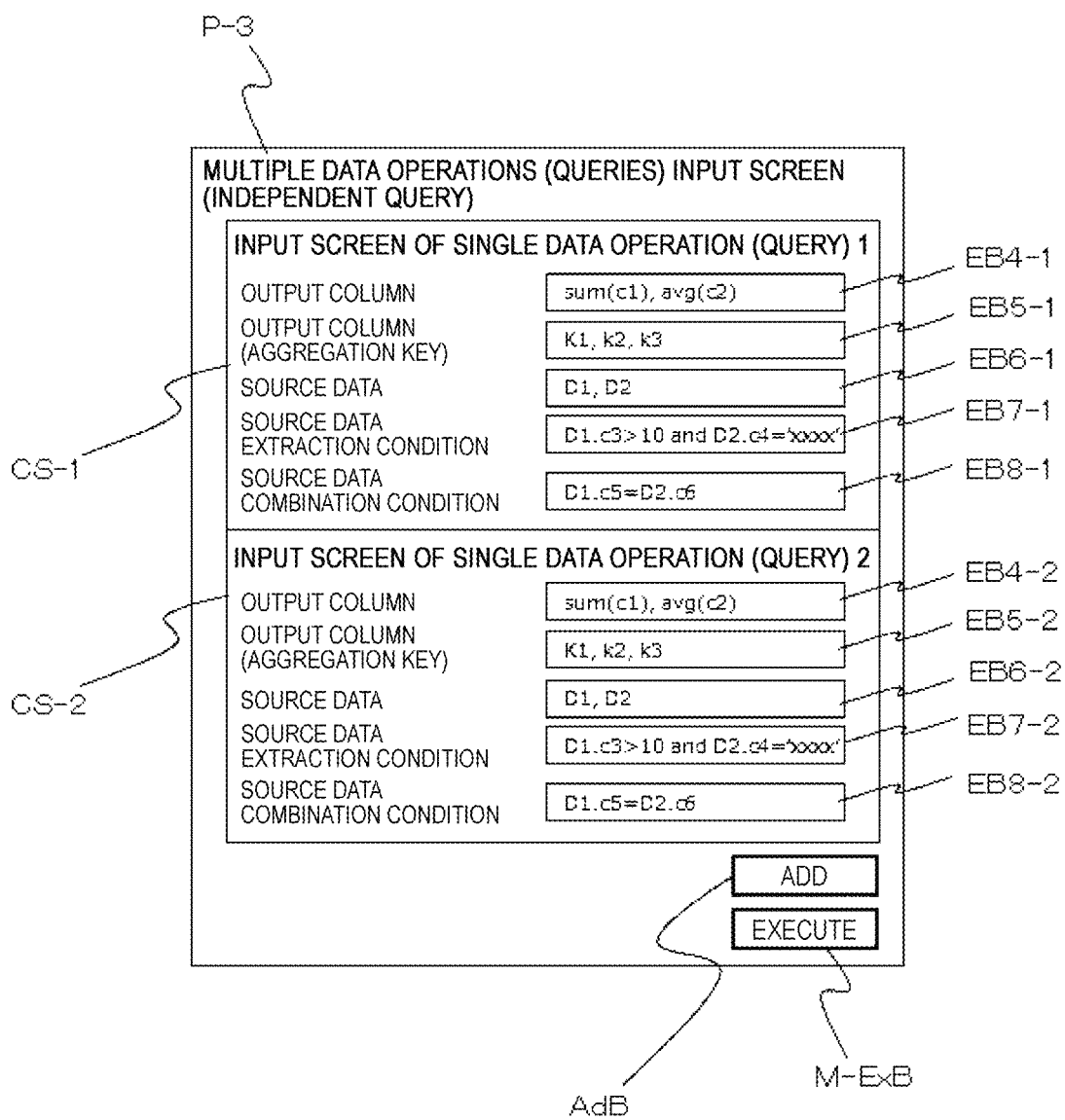
FIG. 25 is a diagram illustrating a specific example of a display screen for inputting a plurality of independent (non-time series) data operations (queries)

FIG. 25 is a diagram showing a specific example of the display screen P-3 for inputting a plurality of independent (non-time series, for example, the same result can be obtained even if the execution order of each process is reversed) data operations (queries). In the example shown in FIG. 25, the input screen of the single data operation (query) 1 is displayed on the upper side of the screen, and the input screen of another independent single data operation (query) 2 is displayed on the lower side of the screen.

On the lower right side of the screen, an "Add" button AdB for adding an input screen of an additional independent single data operation (query) 3 or later, and an "execute" button M-ExB for executing multiple queries set in these screens are displayed.

For example, when the "Add" button AdB is selected from the state shown in FIG. 25, the screens of single data operations (query) 1 and 2 move upward (scroll), and further independent single data operations (queries) 3 and 4 are displayed at the same positions 1 and 2.

The input screen of each single data operation (query) is provided with fields for setting (inputting) "output column", "output column (aggregation key)", "source data", "source data extraction condition" and "source data combination condition". In FIG. 25, the input fields corresponding to the above-mentioned input fields EB4, EB5, EB6, EB7, and EB8 in FIG. 24 are indicated by reference numerals EB4-1, EB5-1, EB6-1, EB7-1, and EB8-1 for the input screen of the query 1, and EB4-2, EB5-2, EB6-2, EB7-2, and EB8-2 for the input screen of the query 2, respectively.

When the execution button M-ExB is selected from the state shown in FIG. 25, such input information is sent from the client terminal 100 to the data processing server 3, and the above-described processing in FIG. 11 is executed on the data processing server 3.

<Multiple Data Operation (Query) Input Screen (Data Flow)>

Figure 26:
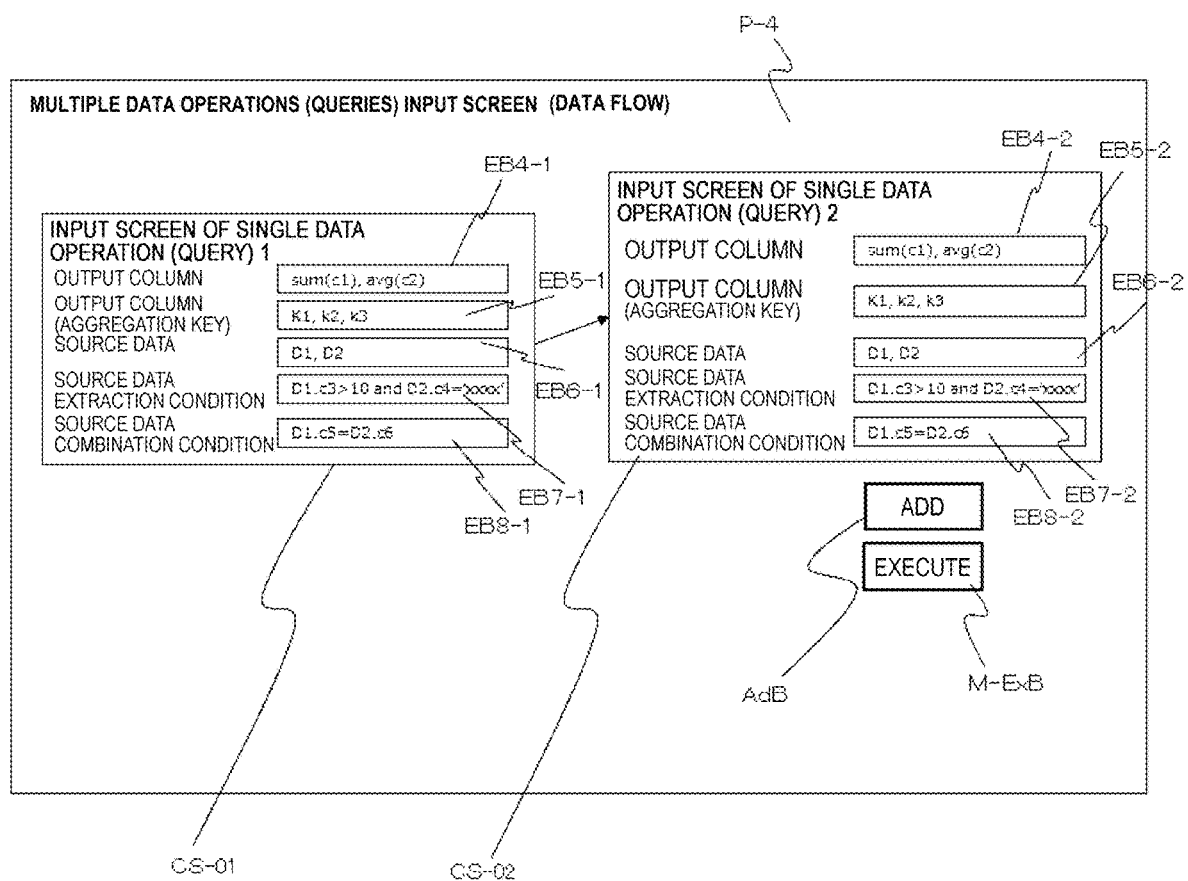
FIG. 26 is a diagram illustrating a specific example of a display screen for inputting a plurality of continuous (time-series) data operations (queries)

FIG. 26 is a diagram showing the display screen P-4 for inputting a plurality of continuous (time-series, for example, the execution order of processes is predetermined) data operation (query). In the example shown in FIG. 26, the input screen (first query input screen CS-01) of the single data operation (query) 1 to be executed first is displayed on the left side of the screen, and the input screen (second query input screen CS-02) of the single data operation (query) 2 to be executed next is displayed on the right side of the same. In addition, on the lower right side of the screen, an "Add" button AdB for adding further input screens of subsequent single data operation (query) 3 or later, and an "execute" button M-ExB for executing multiple queries set in these screens are displayed.

The input screen (CS-01, CS-02) of each single data operation (query) is provided with input fields (EB4-1 to EB8-1, EB4-2 to EB8-2) for setting (inputting) "output column", "output column (aggregation key)", "source data", "source data extraction condition", and "source data combination condition".

When the execution button M-ExB is selected from the state shown in FIG. 26, such input information is sent from the client terminal 100 to the data processing server 3, and the above-described processing in FIG. 12 is executed on the data processing server 3.

<Warning Screen>

Figure 27:
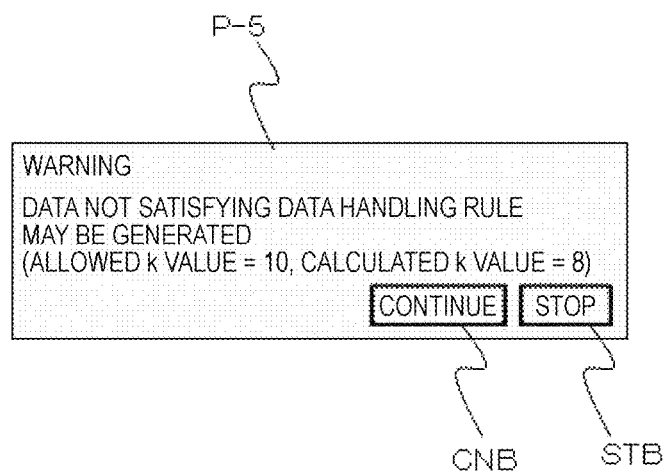
FIG. 27 is a diagram showing an example of a warning screen displayed on the display unit.

FIG. 27 is a diagram showing a display screen P-5 as a warning screen displayed on the data operation (query) input unit 101 to the display unit 1008 of the client terminal 100. As shown in FIG. 27, in one specific example of the warning screen, a warning message indicating the error content is displayed, and a "continue" button CNB and a "stop" button STB are displayed.

In the example shown in FIG. 27, the k value needs to be 10 or more for the generated secondary data, whereas in the query input (designated) by the user, the calculated k value (the calculated value of the k value by the data processing server 3) becomes 8, and the warning screen is displayed because it becomes easy to identify an individual or the like.

Here, in a specific example when the "continue" button CNB is selected by the user, the data processing server 3 performs a process of displaying the previous query input screen (see, for example, FIG. 24) again. Here, if the user selects the execute button EXB with the previous input value as shown in FIG. 24, the warning screen is expected to be displayed again. Therefore, the user is urged to change the input value and select the execute button EXB.

As described in detail above, according to the data processing system 1 (data management system) and the data processing server 3 (data management device) to which the present invention is applied, management for sensitive data is strengthened and data preparation man-hours can be reduced.

The various configuration examples described above can be appropriately combined according to the purpose and the like.

The above-described embodiments or examples are merely examples of embodiment of the present invention, and the technical scope of the present invention should not be construed in a limited manner thereby. That is, the present invention can be implemented in various forms without departing from its gist or its main features.

What is claimed is:

1. A data management device comprising:
a memory; and
a processor operatively coupled with and in communication with the memory, wherein the processor:
acquires a query that includes a data operation, a data source, and an aggregation key string,
acquires data handling rules for the data source,
calculates a statistical information value for the query, wherein the statistical information value includes a k value that has a larger value when it is more difficult to identify an individual record in the data source and a smaller value when the individual record is easier to find in the data source
determines a determination result by comparing the statistical information value according to the data handling rules for the data source;
execute the query to generate secondary data when the determination result indicates that statistical information value complies with the data handling rule, and
does not execute the query when the determination result indicates that the statistical information value does not comply with the data handling rule.

2. The data management device according to claim 1, further comprising the processor calculating a second statistical value for the secondary data is generated.

3. The data management device according to claim 1, the data handling rules are acquired from a-handling rule management table.

4. The data management device according to claim 3, further comprising:
an interface operatively coupled with and in communication with the processor for updating the handling rule management table.

5. A data management system comprising:
the data management device according to claim 1; and
a user terminal that communicates with the data management device, wherein the user terminal is configured to:
transmit the query to the data management device, and,
receive the secondary data from the data management device.

6. The data management system according to claim 5, wherein the processor further:
displays a screen that allows the user terminal to select whether to perform the query when the determination result indicates that the statistical information value does not comply with the data handling rules.

7. A data management method comprising:
acquiring a query that includes a data operation, a data source, and an aggregation key string,
acquiring data handling rules for the data source;
calculating a statistical information value for the query, wherein the statistical information value includes a k value that has a larger value when it is more difficult to identify an individual record in the data source and a smaller value when the individual record is easier to find in the data source;
determining a determination result by comparing the statistical information value according to the data handling rules for the data source; and
selectively executing the query to generate secondary data based on the determination result, wherein the query is executed when the determination result indicates that statistical information value complies with the data handling rule.

* * * * *